United States Patent
Kubota

(10) Patent No.: US 7,272,482 B2
(45) Date of Patent: Sep. 18, 2007

(54) PRECEDING-VEHICLE FOLLOWING CONTROL SYSTEM

(75) Inventor: Kenta Kubota, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 342 days.

(21) Appl. No.: 10/659,376

(22) Filed: Sep. 11, 2003

(65) Prior Publication Data

US 2004/0061626 A1    Apr. 1, 2004

(30) Foreign Application Priority Data

Sep. 30, 2002 (JP) ............................. 2002-286029
Sep. 30, 2002 (JP) ............................. 2002-286030

(51) Int. Cl.
*G08G 1/00* (2006.01)
(52) U.S. Cl. .................... 701/96; 701/93; 701/301; 340/436; 340/901; 342/70
(58) Field of Classification Search ................ 701/58, 701/41, 91, 80, 96, 93, 213, 301, 36, 1; 340/901, 340/435, 436, 932.2; 342/70, 71; 348/148; 180/169, 170; 303/146
See application file for complete search history.

(56) References Cited

U.S. PATENT DOCUMENTS

| | | | | |
|---|---|---|---|---|
| 5,454,442 | A * | 10/1995 | Labuhn et al. .............. | 180/169 |
| 5,684,473 | A * | 11/1997 | Hibino et al. ............... | 340/903 |
| 6,175,799 | B1 | 1/2001 | Tsutsumi et al. | |
| 6,256,573 | B1 | 7/2001 | Higashimata | |
| 6,289,278 | B1 * | 9/2001 | Endo et al. ................ | 701/208 |
| 6,292,737 | B1 | 9/2001 | Higashimata et al. | |
| 6,298,298 | B1 | 10/2001 | Tange et al. | |
| 6,324,465 | B1 * | 11/2001 | Teramura et al. ............ | 701/96 |
| 6,330,507 | B1 | 12/2001 | Adachi et al. | |
| 6,401,024 | B1 | 6/2002 | Tange et al. | |
| 6,405,120 | B1 | 6/2002 | Higashimata et al. | |
| 6,415,217 | B1 | 7/2002 | Higashimata et al. | |
| 6,473,686 | B2 | 10/2002 | Adachi et al. | |
| 7,103,614 | B1 * | 9/2006 | Kucik ..................... | 707/104.1 |
| 2001/0014846 | A1 * | 8/2001 | Sawamoto et al. .......... | 701/96 |
| 2002/0014988 | A1 * | 2/2002 | Samukawa et al. .......... | 342/70 |
| 2002/0016663 | A1 * | 2/2002 | Nakamura et al. .......... | 701/96 |
| 2002/0095254 | A1 | 7/2002 | Egawa et al. | |

(Continued)

FOREIGN PATENT DOCUMENTS

JP    8-136237 A    5/1996

(Continued)

*Primary Examiner*—Tuan C To
(74) *Attorney, Agent, or Firm*—Foley & Lardner LLP

(57) ABSTRACT

A preceding-vehicle following control system for a host vehicle is comprised of a road information device (2, 3) for obtaining road information of a road ahead of the host vehicle, a preceding-vehicle detector (1) for obtaining preceding-vehicle information of a preceding vehicle ahead of the host vehicle and a controller (10) connected to the road information device and the preceding vehicle recognizing device. The controller is arranged to determine a road width of the road from the road information, to vary a condition for determining a control characteristic of a control system of a following control for following the preceding vehicle, and to execute the following control on the basis of the condition for determining the control characteristic and the preceding-vehicle information.

15 Claims, 12 Drawing Sheets

U.S. PATENT DOCUMENTS

| | | | |
|---|---|---|---|
| 2002/0175999 A1* | 11/2002 | Mutobe et al. | 348/148 |
| 2002/0191078 A1* | 12/2002 | Okamoto et al. | 348/148 |
| 2003/0105574 A1* | 6/2003 | Ino et al. | 701/93 |
| 2003/0105578 A1* | 6/2003 | Takenaga et al. | 701/117 |

FOREIGN PATENT DOCUMENTS

| | | |
|---|---|---|
| JP | 11-20503 A | 1/1999 |
| JP | 2001-266163 A | 9/2001 |

* cited by examiner

PRECEDING-VEHICLE FOLLOWING CONTROL SYSTEM

BACKGROUND OF THE INVENTION

The present invention relates to a preceding-vehicle following control system which is arranged to follow a preceding vehicle ahead of a host vehicle while keeping an inter-vehicle distance between the host vehicle and the preceding vehicle at a target inter-vehicle distance.

Japanese Patent Provisional Publication No. 11-20503 discloses a preceding-vehicle hollowing control system which is arranged to set a target vehicle speed based on the sum of a first product and a second product where the first product is obtained by multiplying a difference between an inter-vehicle distance and a target inter-vehicle distance and a first gain, and the second product is obtained by multiplying a relative speed between the host vehicle and a preceding vehicle and a second gain, and to control a driving/braking force so as to bring the vehicle speed closer to the target vehicle speed.

SUMMARY OF THE INVENTION

An inventor of the present invention has researched the effects of a road width including a lane width and the number of lanes on a driver. As a result of this research, the inventor has found a fact that a driver has a strange feeling that a vehicle speed on a wide road is higher than a vehicle speed on a narrow road when a host vehicle approaches a preceding vehicle through a preceding-vehicle following control, and a strange feeling that an inter-vehicle distance on a narrow road having is shorter than that on a wide road when the preceding-vehicle following control is executed, although the road width such as the number of lanes and the lane width of the traveling road does not affect the controllability of the preceding-vehicle following control.

It is therefore an object of the present invention to provide a preceding-vehicle following control system which is capable of executing a following control while preventing a driver from having a strange feeling even in the above discussed scenarios.

An aspect of the present invention resides in a preceding-vehicle following control system which is for a host vehicle and comprises a controller arranged to obtain road width indicative information of a road traveled by the host vehicle, and to execute a following control for following a preceding vehicle ahead of the host vehicle according to the road width indicative information.

Another aspect of the present invention resided in a preceding-vehicle following control system for a host vehicle. The preceding-vehicle following control system comprises a road information device which obtains road information as to a road traveled by the host vehicle, a preceding-vehicle recognizing device which obtains preceding-vehicle information of a preceding vehicle ahead of the host vehicle, and a controller connected to the road information device and the preceding vehicle recognizing device. The controller is arranged to determine a road width of the road from the road information, to vary a condition for determining a control characteristic of a control system of a following control for following the preceding vehicle, and to execute the following control on the basis of the condition for determining the control characteristic and the preceding-vehicle information.

A further aspect of the present invention resides in a method of controlling a host vehicle, which comprises an operation of obtaining road width indicative information of a road traveled by the host vehicle, and an operation of executing a following control for following a preceding vehicle ahead of the host vehicle according to the road with indicative information.

The other objects and features of this invention will become understood from the following description with reference to the accompanying drawings.

DETAILED DESCRIPTION OF THE INVENTION

Figure 1:
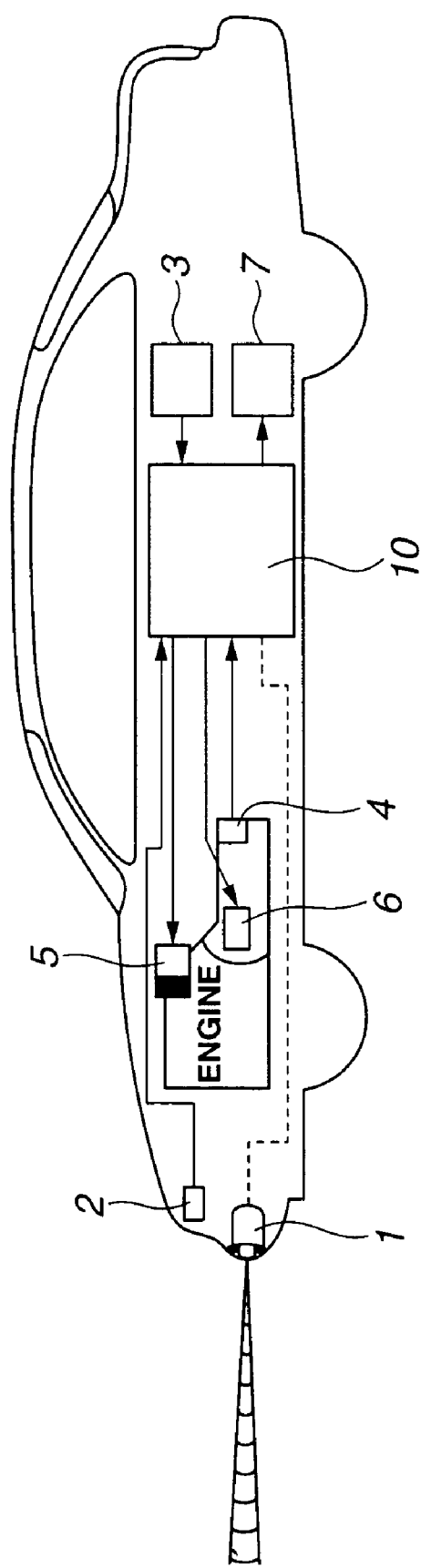
FIG. 1 is a schematic view showing a preceding-vehicle following control system of a first embodiment according to the present invention.

Referring to the drawings, there are discussed embodiments according to the present invention in detail.

First, there will be discussed a first embodiment of a preceding-vehicle following control system according to the present invention, with reference to FIGS. 1 through 9.

FIG. 1 shows a schematic view showing the preceding-vehicle following control system (adaptive cruise control system) according to a first embodiment of the present invention. A preceding-vehicle following control executed by the preceding-vehicle following control system is one or all of functions of a so-called adaptive cruise control (ACC). An inter-vehicle distance sensor 1 is constructed by a sensor head of a radar type which emits laser beams forward of a host vehicle and receives reflection beams from a preceding vehicle ahead of the host vehicle to measure an inter-vehicle distance between the host vehicle and the preceding vehicle. Inter-vehicle distance sensor 1 may be arranged to measure the inter-vehicle distance using radio-wave or ultrasonic-wave. A CCD camera 2 takes pictures of a road ahead of the host vehicle. For example, CCD camera 2 is installed at a front portion or in a passenger compartment of the host vehicle. A car-navigation system 3 provides information as to roads to a driver. Car-navigation system 3 comprises a memory for recording road map data and provides information as to the road around a desired point on the basis of the road map data stored in the memory. A vehicle speed sensor 4 is attached to an output shaft of an automatic transmission 6 and outputs a pulse train having a cycle corresponding to a rotation speed of the output shaft. A throttle actuator 5 opens and closes a throttle valve according to a throttle opening signal. An engine output is controlled by varying an intake air quantity through the operation of throttle actuator 5. Automatic transmission 6 is arranged to vary a transmission ratio according to the vehicle speed and the throttle opening. A brake apparatus 7 generates a braking force of the host vehicle.

A following controller 10 is provided with a microcomputer and peripheral devices thereof. Following controller 10 is arranged to obtain a target inter-vehicle distance on the basis of a detection value of the inter-vehicle distance and a detection value (actual value) of the host vehicle speed and to control throttle actuator 5, automatic transmission 7 and brake apparatus 8 so as to bring the actual host-vehicle speed closer to the target vehicle speed. Following controller 10 constructs a vehicle speed processing section 11, an image processing section 12, a vehicle speed controlling section 13, a distance signal processing section 14 and a preceding-vehicle following control section 30 in the form of software.

Distance signal processing section 14 calculates a time period from an emitting moment when inter-vehicle distance sensor 1 emits laser beams to a receiving moment when inter-vehicle distance sensor 1 receives reflection beams reflected by a preceding vehicle, and calculates an inter-vehicle distance from the obtained time period. A vehicle speed signal processing section 11 receives a cycle of the vehicle speed indicative pulse from vehicle speed sensor 4 and calculates the host vehicle speed from the pulse cycle.

Preceding-vehicle following control section 30 comprises a relative speed calculating section 31, an inter-vehicle distance controlling section 32 and a target inter-vehicle distance setting section 33. Preceding-vehicle following control section 30 calculates a target inter-vehicle distance L* and a target vehicle speed V* on the basis of inter-vehicle distance L and host-vehicle speed V. More specifically, relative speed calculating section 31 calculates a relative speed ΔV between the host vehicle speed V and a vehicle speed $V_T$ of a preceding vehicle on the basis of inter-vehicle distance L obtained at distance signal processing section 14. Inter-vehicle distance controlling section 32 calculates target vehicle speed V* for bringing inter-vehicle distance L closer to target inter-vehicle distance L* upon taking account of relative speed ΔV. Target inter-vehicle distance setting section sets target inter-vehicle distance L* according to a preceding-vehicle speed $V_T$ or host-vehicle speed V. Further, a vehicle speed controlling section 13 controls a throttle opening of throttle actuator 5, a transmission ratio of automatic transmission 6 and a braking force generated by brake apparatus 7 so as to bring host-vehicle speed V closer to target vehicle speed V*.

Subsequently, there are discussed distance signal processing section 14 and preceding vehicle following control section 30 in detail. First, a calculation method of relative speed ΔV is discussed.

Figure 3:
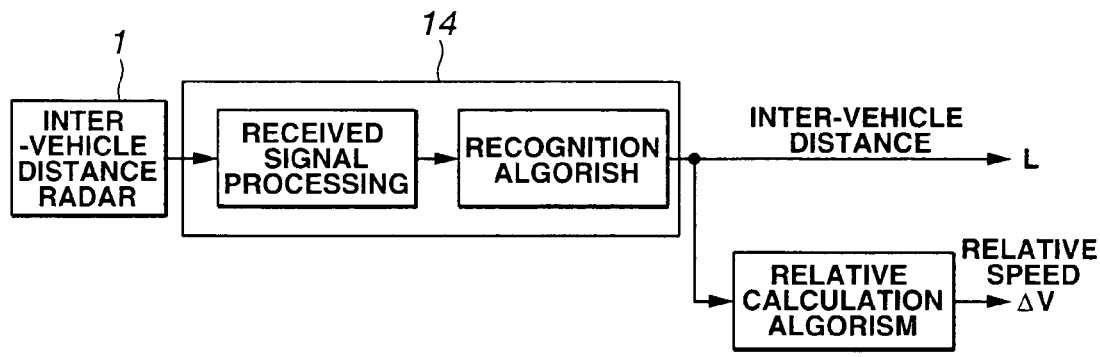
FIG. 3 is a block diagram employed for explaining a distance signal processing section of the following controller.
Figure 4:
FIG. 4 is a block diagram employed for explaining a relative speed calculating section of the following controller.
Figure 5:
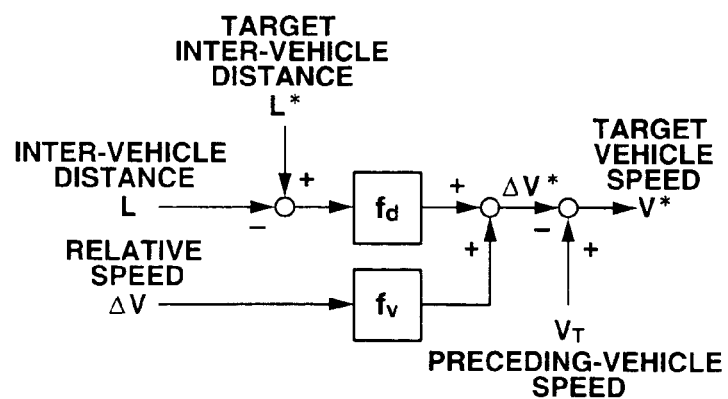
FIG. 5 is a block diagram employed for explaining an inter-vehicle distance controlling section of the following controller.
Figure 6:
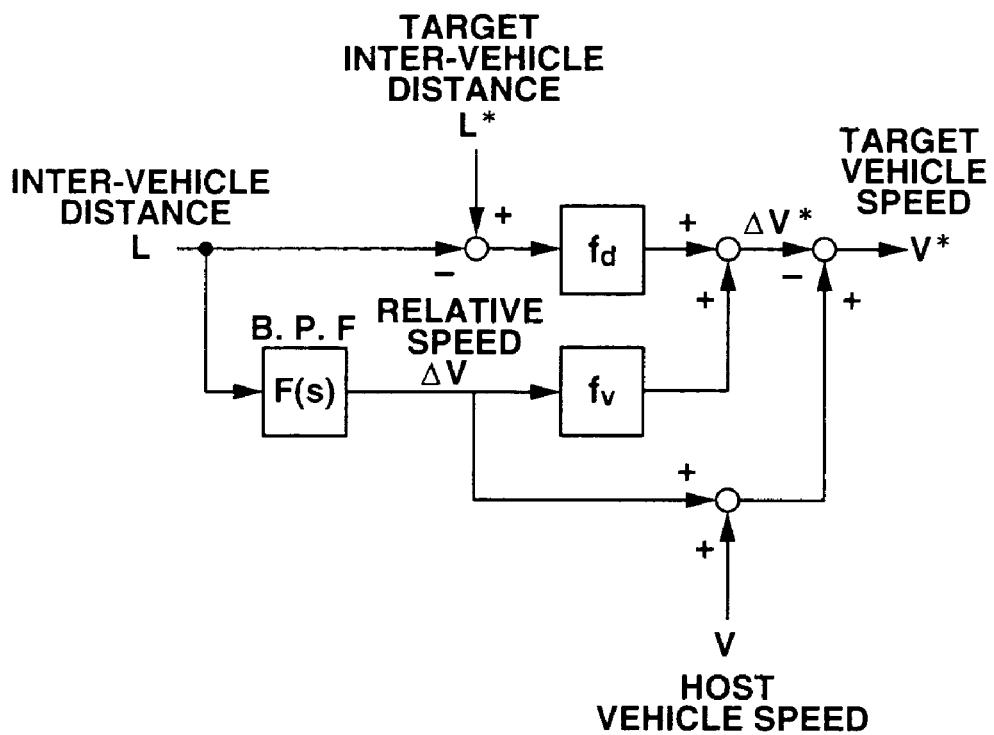
FIG. 6 is a block diagram employed for explaining an inter-vehicle distance controlling section of the following controller.

As shown in FIGS. 3 and 4, it is possible to approximately obtain relative speed ΔV using a band-pass filter or bypass-filter where inter-vehicle distance L calculated at distance signal processing section 14 is employed as an input to the filter. For example, the band-pass filter is constructed by a transfer function expressed by the following expression (1).

$$F(s) = \omega_c^2 s / (s^2 + 2\zeta\omega_c s + \omega_c^2) \quad (1)$$

where $\omega_c$ is $2\pi f_c$, s is Laplace operation, and $f_c$ is a cutoff frequency which is of the filter transmission function and is determined from a magnitude of a noise component included in inter-vehicle distance L and an allowable value of a vehicle longitudinal-G fluctuation in short cycle.

Subsequently, there will be discussed a following control for following a preceding vehicle while maintaining inter-vehicle distance L at a target inter-vehicle distance L*.

Figure 2:
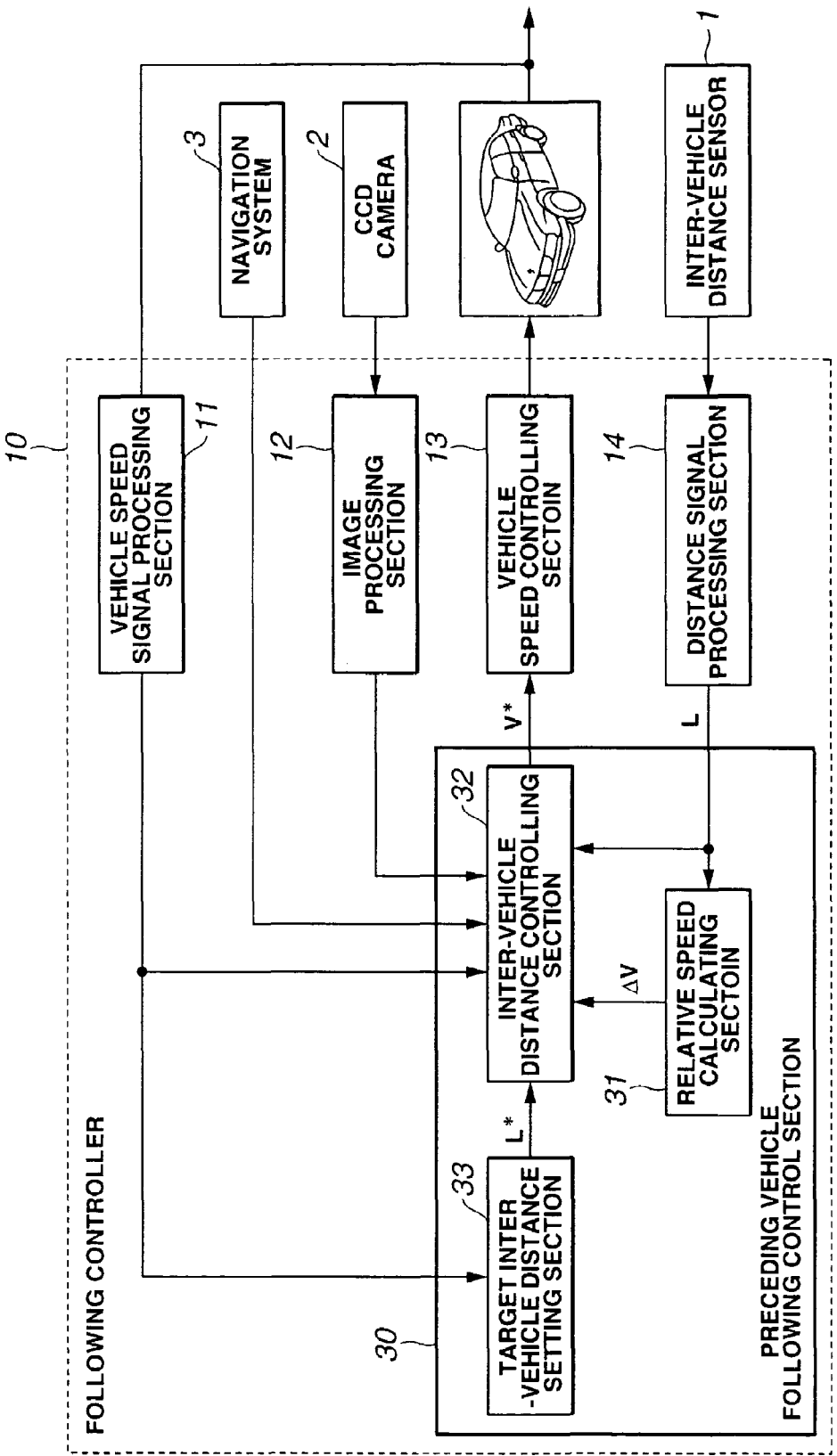
FIG. 2 is a block diagram showing a following controller of the preceding-vehicle following control system of FIG. 1.

A basic control system of this following control is constructed by preceding-vehicle following control section 30 and vehicle speed controlling section 12 which are independently provided, as shown in FIG. 2. An output of preceding vehicle following control section 30 is target vehicle speed V*, and therefore, inter-vehicle distance L is not directly employed in this control system.

Inter-vehicle distance controlling section 32 of preceding-vehicle following control section 30 calculates target vehicle speed V* for executing the following control with respect to the preceding vehicle while maintaining inter-vehicle distance L at target inter-vehicle distance L*, on the basis of inter-vehicle distance L and relative speed ΔV. More specifically, target vehicle speed V* is obtained by subtracting a summed value ΔV* from a preceding vehicle speed $V_T$ where summed value ΔV* is obtained by adding a first product of a first control gain $f_d$ and a difference (L*−L) between target inter-vehicle distance L★* and actual inter-vehicle distance L and a second product of a second control gain fv and relative speed ΔV, as shown in the following expression (2).

$$V^* = V_T - \Delta V^* \quad (2)$$

where $\Delta V^* = f_d(L^*-L) + f_v \cdot \Delta V$, first and second control gains $f_d$ and $f_v$ are parameters for determining the following control performance relative to the preceding vehicle.

Since this control system is a one-input and two-output system for controlling two target values (the inter-vehicle distance and the relative speed) using one input (the target vehicle speed), this control system has been designed using a state feedback (regulator) as a control method.

Hereinafter, the procedure of designing the control system is explained.

First, state variables $x_1$ and $x_2$ of the control system is defined using the following expressions (3).

$$x_1 = V_T - V, \; x_2 = L^* - L \quad (3)$$

Further, a control input (an output of a controller) $\Delta V^*$ is defined using the following expression (4).

$$\Delta V^* = V_T - V^* \quad (4)$$

Inter-vehicle distance L is expressed by the following expression (5).

$$L = \int (V_T - V) dt + L_0 \quad (5)$$

A vehicle speed servo system is approximately expressed by a linear transfer function, such as the following expression (6) where actual vehicle speed V performs a first-order lag relative to target vehicle speed $V^*$.

$$V = 1/(1+\tau_v \cdot s)$$

$$dV/dt = 1 + \tau_v(V^* - V) \quad (6)$$

Therefore, assuming that preceding-vehicle speed $V_T$ is constant, on the basis of the expressions (3), (4) and (6), state variable $x_1$, is expressed by the following expression (7).

$$dx_1/dt = -1/\tau_v \cdot x_1 + 1/\tau_v \cdot \Delta V^* \quad (7)$$

Further, assuming that target inter-vehicle distance $L^*$ is constant, on the basis of the expressions (3) and (5), state variable $x_2$ is expressed by the following expression (8).

$$x_2 = -(V_T - V) = -x_1 \quad (8)$$

Accordingly, on the basis of the expressions (7) and (8), a state equation of the system is expressed by the following expression (9).

$$\frac{d}{dt}\begin{bmatrix} x_1 \\ x_2 \end{bmatrix} = \begin{bmatrix} -1/\tau_v & 0 \\ -1 & 0 \end{bmatrix}\begin{bmatrix} x_1 \\ x_2 \end{bmatrix} + \begin{bmatrix} 1/\tau_v \\ 0 \end{bmatrix}\Delta V^* \quad \therefore \dot{X} = AX + Bu \quad (9)$$

where $$x = \begin{bmatrix} x_1 \\ x_2 \end{bmatrix}, A = \begin{bmatrix} -1/\tau_v & 0 \\ -1 & 0 \end{bmatrix}, B = \begin{bmatrix} 1/\tau_v \\ 0 \end{bmatrix},$$

and $u = \Delta V^*$.

Further, the equation of state as to a total system including the state feedback is expressed by the following expression (10).

$$dx/dt = (A+BF)X \quad (10)$$

where $u = FX$, and $F = [f_v, f_d]$.

Accordingly, a characteristic equation of the total system is expressed by the following expression (11) on the basis of the expression (10).

$$|sI - A'| = s^2 + (1-f_v)/\tau_v \cdot s + f_d/\tau_v = 0 \quad (11)$$

where $A' = A + BF$, and $$A' = \begin{bmatrix} (f_v - 1)/\tau_v & f_d/\tau_v \\ -1 & 0 \end{bmatrix}.$$

A vehicle speed servo system of vehicle speed controlling section 13 is approximately expressed by a linear transfer function, and therefore first and second control gains $f_d$ and $f_v$ are designed according to the following expressions (12) so that a conversion characteristic of converging from inter-vehicle distance L to target inter-vehicle distance $L^*$ and a conversion characteristic of converging from relative speed $\Delta V$ to zero, on the basis of the transfer characteristic correspond to the characteristics (a damping coefficient $\zeta$ and a natural frequency $\omega_n$ of the system) intended by a designer of this system. Natural frequency $\omega_n$ is set according to a number of lanes, and this setting is discussed later.

$$f_v = 1 - 2\zeta\omega_n \cdot \tau_v$$

$$f_d = \omega_n^2 \cdot \tau_v \quad (12)$$

On the other hand, since relative speed $\Delta V$ is a difference between the preceding-vehicle speed and the host-vehicle speed, the preceding-vehicle speed $V_T$ is calculated on the basis of host-vehicle speed V and relative speed $\Delta V$ using the following expression (13).

$$V_T = V + \Delta V \quad (13)$$

Accordingly, on the basis of the expressions (2) and (13), target vehicle speed $V^*$ is expressed by the following expression (14).

$$V^* = V - f_d(L^* - L) + (1 - f_v)\Delta V \quad (14)$$

Although target inter-vehicle distance $L^*$ may be set using a concept of a headway time (or time gap) mainly employed in an alarm of approaching a preceding vehicle, target inter-vehicle distance $L^*$ is set as a function of preceding-vehicle speed $V_T$ in view of never affecting the convergence performance of the control in this embodiment. Using preceding-vehicle speed $V_T$ defined by the expression (13), target inter-vehicle distance L is set as shown by the following expression (15).

$$L = a \cdot V_T + L_0 = a(V + \Delta V) + L_0 \quad (15)$$

where $L_0$ is an initial value of the inter-vehicle distance.

Figure 7:
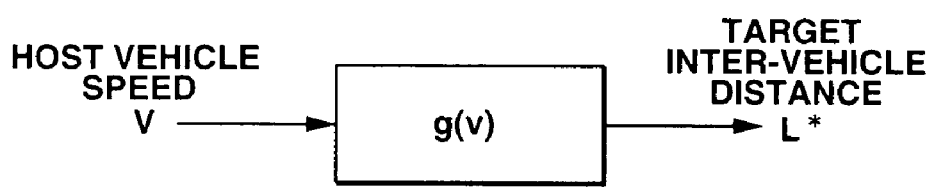
FIG. 7 is a block diagram employed for explaining an inter-vehicle distance setting section of the following controller.

If a value calculated from host-vehicle speed V and relative speed $\Delta V$ is employed as preceding-vehicle speed $V_T$, noises superimposed by the relative speed detection value affects preceding-vehicle speed $V_T$. Therefore, preceding-vehicle speed $V_T$ may be set as a function of host-vehicle speed V as shown in FIG. 7 and as shown by the following expression (16).

$$L^* = a \cdot V + L_0 \quad (16)$$

Figure 8:
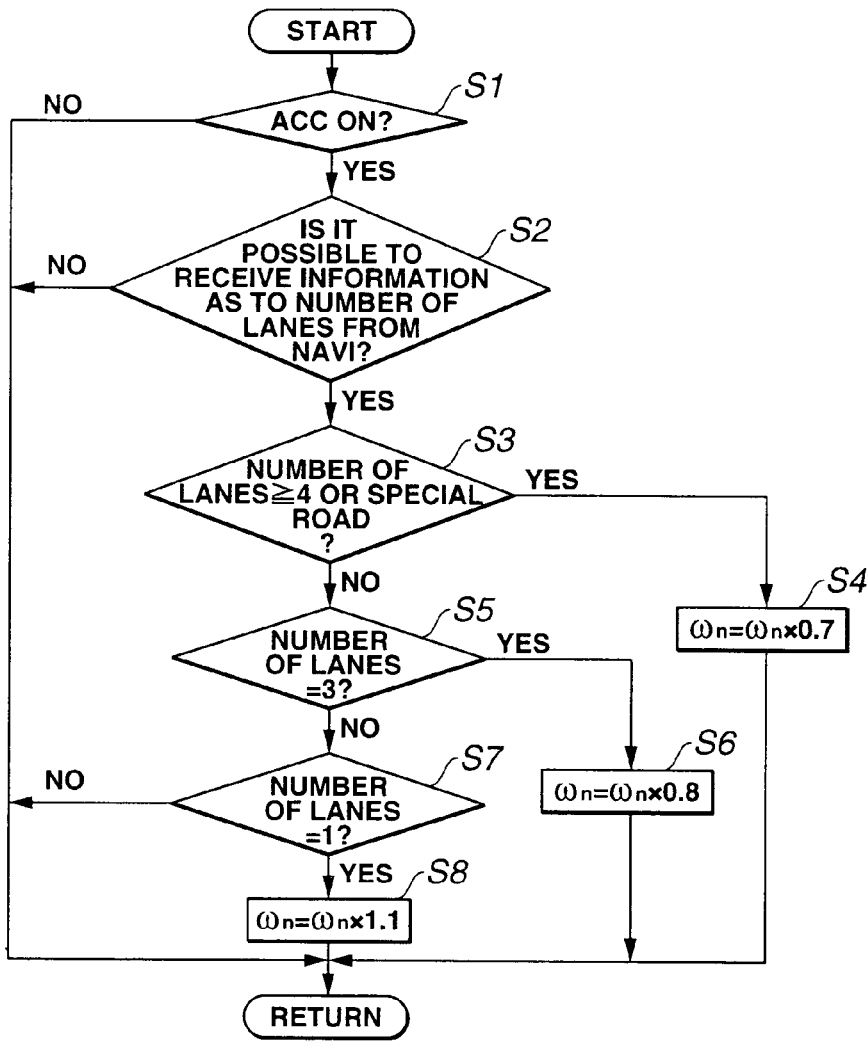
FIG. 8 is a flowchart showing a natural frequency setting processing executed in the first embodiment.

These above discussed contents are the control principle for following the preceding vehicle while keeping inter-vehicle distance L at target inter-vehicle distance $L^*$. Subsequently, there is discussed a natural frequency setting process for setting natural frequency $\omega_n$. The preceding-vehicle following control system according to the present invention is arranged to set natural frequency employed in case of approaching a preceding vehicle is set according to the number of lanes of a traveling road. FIG. 8 is a flowchart showing the natural frequency setting processing for setting natural frequency $\omega_n$. This processing is executed by vehicle speed controlling section 12 or following controlling section 30 at predetermined time intervals.

At step S1, following controller 10 comprising vehicle speed control section 12 and following control section 30 determines whether or not ACC (adaptive cruise control) is set in an operative state (ACC ON ?). ACC includes the preceding-vehicle following control, and is activated by manually turning on an ACC switch by a driver. When the determination at step S1 is affirmative (ACC ON), the program proceeds to step S2. When the determination at step S1 is negative, the present processing is terminated.

At step S2 controller 10 determines whether or not it is possible to receive information as to the number of lane of the traveling road from car navigation system 3. When the determination at step S2 is affirmative, the program proceeds to step S3. When the determination at step S2 is negative, the present processing is terminated.

At step S3 controller 10 determines whether or not the number of lanes is greater than or equal to 4 or the traveling road is a special road. Herein, the special road includes a road having an extremely wide shoulder although the number of lanes is small, or a road from which a driver of the host vehicle has an impression as same as that in case that the host vehicle travels a road having multi-lanes more than 3 lanes. For example, in case that controller 10 receives information as to a special road from car navigation system 3 as a result that car navigation system 3 has previously stored such information as the special road in the road map data, controller 10 determines that the traveling road is a special road.

When the determination at step S3 is affirmative, that is, when the number of lanes is greater than or equal to 4 (number of lanes $\geq$4) or when the traveling road is the special road, the program proceeds to step S4 wherein controller 10 changes natural frequency $\omega_n$ at a product of original frequency $\omega_n$ (default value) and 0.7 ($\omega_n=\omega_n\times0.7$), and the present routine is then terminated. When the determination at step S3 is negative, the program proceeds to step S5.

At step S5 subsequent to the negative determination at step S3, controller 10 determines whether or not the number of lanes is equal to 3. When the determination at step S5 is affirmative, the program proceeds to step S6 wherein controller 10 changes natural frequency $\omega_n$ at a product of original natural frequency (default value) $\omega_n$ and 0.8 ($\omega_n=\omega_n\times0.8$), and the present routine is then terminated. When the determination at step S5 is negative, the program proceeds to step S7.

At step S7 controller 10 determines whether or not the number of lanes is 1. When the determination at step S7 is affirmative, the program proceeds to step S8 wherein controller 10 changes natural frequency $\omega_n$ at a product of original natural frequency (default value) $\omega_n$ and 1.1 ($\omega_n=\omega_n\times1.1$), and the present routine is then terminated. When the determination at step S7 is negative, the present routine is terminated.

When the number of lanes is 2, natural frequency $\omega_n$ is maintained at original frequency (default value) $\omega_n$. That is, the processing executed in case of 2 lanes is equal to the processing that the product of original natural frequency (default value) $\omega_n$ and 1.0 is employed as new natural frequency $\omega_n$. Further, when controller 10 determines at step S2 that it is impossible to obtain the information as to the number of lanes from car navigation system 3, original natural frequency (default value) $\omega_n$ is directly employed without being multiplied by any coefficient.

In such a manner of explained above, natural frequency $\omega_n$ is set. In the above processing, the processing of steps S2, S3, S5 and S7 constructs a road width detecting means for detecting a road width (number of lanes). The processing at steps S4, S6 and S8 constructs a vehicle speed control means for controlling a vehicle speed on the basis of the road width detected by the road width detecting means.

The manner of operation of the first embodiment will be discussed hereinafter.

It is now assumed that ACC is set in an operative condition. This assumption may include a case that a preceding vehicle disappears during ACC set condition, that a lane change of the host vehicle is executed during ACC set condition, or that the host vehicle overtakes a preceding vehicle.

In reply to the on-setting of ACC, preceding vehicle following control section 30 or vehicle speed control section 13 of following controller 10 executes the natural frequency setting processing shown in FIG. 8. When controller 10 can receive the information as to the number of lanes from car navigation system 3 by the execution of step S2 in FIG. 8, controller 10 determines natural frequency $\omega_n$ according to the number of lanes. More specifically, when the number of lanes of the road now traveled by the host vehicle is greater than or equal to 4 ([number of lanes] $\geq$4), or when the road traveled by the host vehicle is a special road, the product of original natural frequency (default value) $\omega_n$ and 0.7 is set as new natural frequency $\omega_n$ ($\omega_n=\omega_n\times0.7$) by the execution of steps S3 and S4 in FIG. 8. When the number of lanes of the road now traveled by the host vehicle is 3 ([number of lanes]=3), the product of original natural frequency (default value) $\omega_n$ and 0.8 is set as new natural frequency $\omega_n$ ($\omega_n=\omega_n\times0.8$) by the execution of steps S5 and S6 in FIG. 8. When the number of lanes of the road now traveled by the host vehicle is 1 ([number of lanes]=1), the product of original natural frequency (default value) $\omega_n$ and 1.1 is set as new natural frequency $\omega_n$ ($\omega_n=\omega_n\times1.1$) by the execution of steps S7 and S8 in FIG. 8. Further, when the number of lanes of the road now traveled by the host vehicle is 2 ([number of lanes]=2), or when it is not possible to receive the information as to the number of lanes, original natural frequency (default value) $\omega_n$ is maintained without being multiplied by any coefficient.

Further, when there is a preceding vehicle ahead of the host vehicle, controller 10 executes the following control. For example, in case that a preceding vehicle disappears during ACC set condition, that a lane change of the host vehicle is executed during ACC set condition, or that the host vehicle overtakes a preceding vehicle, when a preceding vehicle is then detected, controller 10 executes the preceding vehicle following control using natural frequency $\omega_n$ set in the manner explained above.

Figure 9:
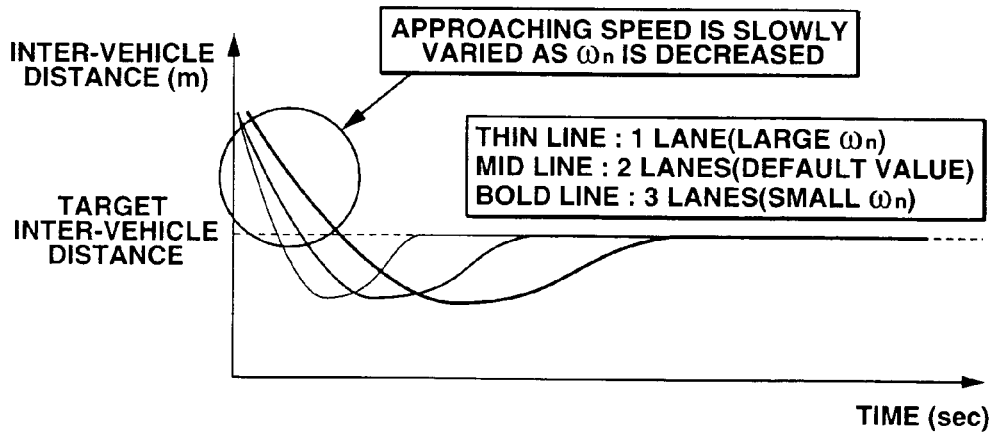
FIG. 9 is a graph showing a preceding-vehicle following characteristic by each number of lanes in case that natural frequency is set according to the number of lanes in the first embodiment.

FIG. 9 shows characteristics of the preceding-vehicle following control executed in the first embodiment according to the present invention. These characteristics is the following characteristics during a period until the host vehicle achieves the target inter-vehicle distance for each natural frequency $\omega_n$, that is, by each number of lanes of the traveling road. In FIG. 9, a thin line shows a characteristic under a condition that the host vehicle travels a road having 1 lane (1-lane road) and therefore natural frequency $\omega_n$ is set at a value greater than the default value. A mid line shows a characteristic under a condition that the host vehicle travels a road having 2 lanes (2-lane road) and therefore natural frequency $\omega_n$ is set at the default value. A bold line shows a characteristic in case that the host vehicle travels a road having 3 lanes (3-lane road) and therefore natural frequency $\omega_n$ is set at a value smaller than the default value.

As is apparent from these characteristic lines, each characteristic of each condition of the number of lanes is set to be converged into the target inter-vehicle distance L*. On the other hand, a time period necessary for reaching the target inter-vehicle distance increases as the number of lanes becomes larger, that is, as natural frequency $\omega_n$ is decreased. The converging characteristic to the target inter-vehicle distance L* is achieved by slower change of the vehicle speed as the number of lanes of the traveling road increases.

Herein, the characteristics shown in FIG. 9 can be explained using the expressions (12), (13) and (14) as follows.

According to the expressions (12), control gain $f_v$ becomes larger as natural frequency $\omega_n$ is decreased. Similarly, according to the expressions (12), control gain $f_d$ becomes smaller as natural frequency $\omega_n$ is decreased. According to the expression (13), host vehicle speed V is greater than preceding vehicle speed $V_T$ when the host vehicle approaches the preceding vehicle. Therefore, relative state $\Delta V$ takes a negative value (minus value) during this approaching period. Thus, by decreasing natural frequency $\omega_n$, control gain $f_v$ is increased and control gain $f_d$ is decreased.

Further, when the host vehicle approaches the preceding vehicle, the actual inter-vehicle distance L becomes larger than target inter-vehicle distance L and relative speed $\Delta V$ takes a negative value. Therefore, in the expression (14), a right-side second term $(-f_d(L^*-L))$ takes a positive value (plus value) as small as possible, and a right-side third term $(+(1-f_v)\Delta V)$ takes a positive as small as possible, as far as $f_v$ is smaller than 1. As a result, by decreasing natural frequency $\omega_n$, target vehicle speed V* takes a small value as small as possible. Further, this target vehicle speed V* functions as a control target of the host vehicle speed V when the host vehicle approaches a preceding vehicle.

As discussed above, due to the expressions (12), (13) and (14), by setting such that natural frequency $\omega_n$ is decreased as the number of lanes of the traveling road increases, the characteristic for approaching the target inter-vehicle distance becomes slower. That is, the convergence characteristic to the target inter-vehicle distance performs a slower change of the vehicle speed as the number of lanes of the traveling road increases.

Thus, the preceding-vehicle following control system of the first embodiment according to the present invention executes the preceding-vehicle following control by setting natural frequency $\omega_n$ according to the number of lanes and by decreasing the change of the vehicle speed toward the target inter-vehicle distance as the number of lanes of the traveling road increases.

The advantages of the first embodiment according to the present invention will be discussed. As discussed above, the preceding vehicle following control system employing the present invention executes the preceding vehicle following control by setting natural frequency $\omega_n$ according to the number of lanes and by decreasing the change of the vehicle speed toward the target inter-vehicle distance as the number of lanes increases. Generally, when the host vehicle travels a road having many lanes and when the driver of the host vehicle tries to approach a preceding vehicle ahead of the host vehicle, the driver tends to feel that the approaching speed is too high. Taking account of this tendency, the preceding-vehicle following control system of the first embodiment of the present invention is arranged such that the host vehicle approaches a preceding vehicle to achieve the target inter-vehicle distance, by decreasing the change of the vehicle speed as the number of lanes of the traveling road increases. Therefore, it is possible to suppress or prevent the driver from having such a feeling of approaching the preceding vehicle at too high vehicle speed.

Subsequently, there will be discussed a second embodiment of the preceding-vehicle following control system according to the present invention with reference to FIGS. 10 and 11.

Although the first embodiment is arranged such that the change of the vehicle speed for a period approaching the target inter-vehicle distance is decreased as the number of lanes of the traveling road increases, the second embodiment is arranged such that a damping coefficient $\zeta$ is set according to the number of lane of the traveling road. By this arrangement, the change of the vehicle for a period approaching the target inter-vehicle distance is decreased as the number of lanes of the traveling road increases.

The preceding-vehicle following control system of the second embodiment is arranged such that vehicle speed control section 13 or preceding vehicle following control section 30 of controller 10 executes the setting of damping coefficient $\zeta$ according to the number of lanes. The other construction of controller 10 of the second embodiment is basically the same as that of the first embodiment shown in FIGS. 1 through 7, and the explanation thereof is omitted herein.

Figure 10:
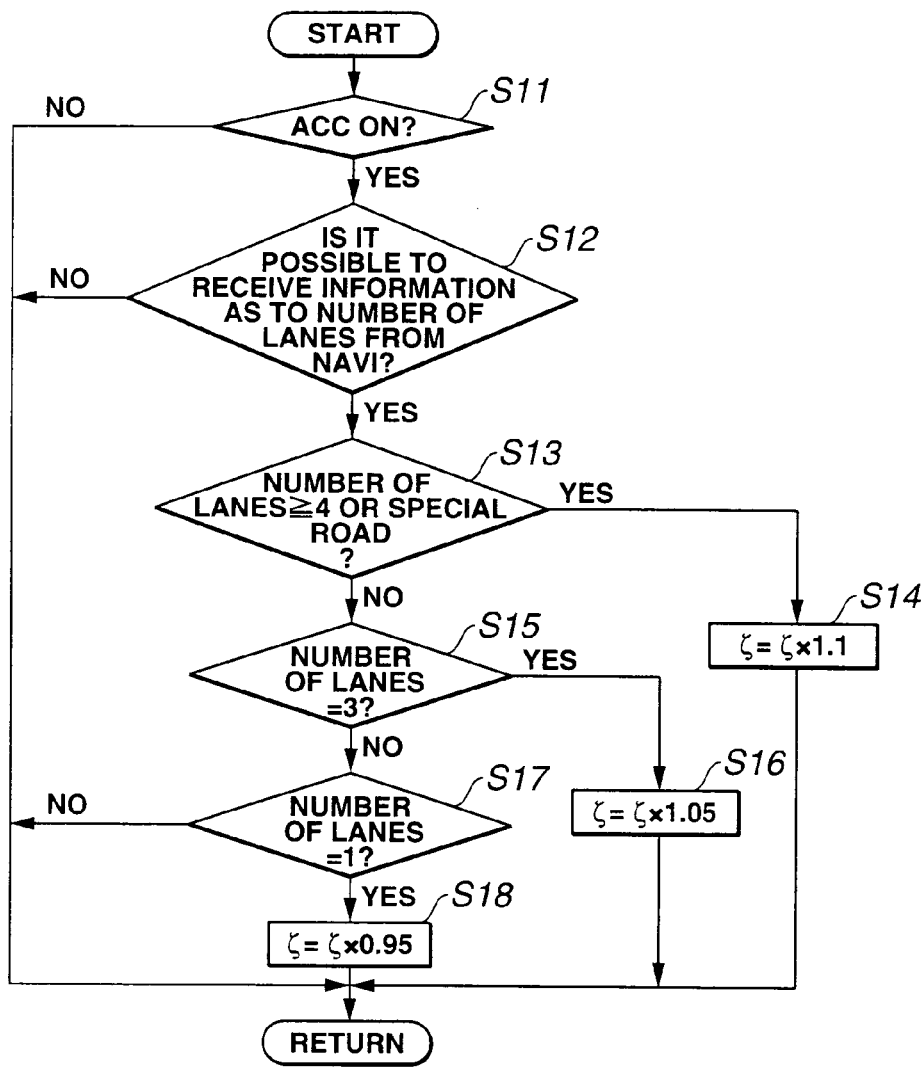
FIG. 10 is a flowchart showing a damping coefficient setting processing executed in a second embodiment.

FIG. 10 is a flowchart showing a damping coefficient setting processing for setting damping coefficient $\zeta$. Vehicle speed control section 13 or preceding vehicle following control section 30 of controller 10 of the second embodiment executes this damping coefficient setting processing at predetermined time intervals.

At step S11 controller 10 determines whether or not ACC (adaptive cruise control) is set in an operative condition. When the determination at step S11 is affirmative, the program proceeds to step S12. When the determination at step S11 is negative, the present processing is terminated.

At step S12 controller 10 determines whether or not it is possible to receive information as to the number of lane of the traveling road from car navigation system 3. When the determination at step S12 is affirmative, the program proceeds to step S13. When the determination at step S12 is negative, the present processing is terminated.

At step S13 controller 10 determines whether or not the number of lanes is greater than or equal to 4 or the traveling road is a special road. When the determination at step S13 is affirmative, that is, when the number of lanes is greater than or equal to 4 (number of lanes $\geq 4$) or when the traveling road is the special road, the program proceeds to step S14 wherein controller 10 changes damping coefficient $\zeta$ at a product of damping coefficient $\zeta$ (default value) and 1.10 ($\zeta=\zeta\times1.10$), and the present routine is then terminated. When the determination at step S13 is negative, the program proceeds to step S15.

At step S15 subsequent to the negative determination at step S13, controller 10 determines whether or not the number of lanes is equal to 3. When the determination at step S15 is affirmative, the program proceeds to step S16 wherein controller 10 changes damping coefficient $\zeta$ at a product of damping coefficient $\zeta$ (default value) and 1.05 ($\zeta=\zeta\times1.05$), and the present routine is then terminated. When the determination at step S15 is negative, the program proceeds to step S17.

At step S17 controller 10 determines whether or not the number of lanes is 1. When the determination at step S17 is affirmative, the program proceeds to step S18 wherein controller 10 changes damping coefficient $\zeta$ to a product of damping coefficient (default value) $\zeta$ and 0.95 ($\zeta=\zeta\times0.95$), and the present routine is then terminated.

When the number of lanes is 2, damping coefficient $\zeta$ is maintained at original damping coefficient (default value) $\zeta$. That is, the processing executed in case of 2 lanes is equal to a processing that the product of original damping coefficient (default value) $\zeta$ and 1.00 is employed as new damping coefficient (default value) $\zeta$. Further, when controller 10 determines at step S12 that it is impossible to obtain the information as to the number of lanes from car navigation system 3, original damping coefficient (default value) $\zeta$ is directly employed without being multiplied by any coefficient.

Thus, in the manner of explained above, damping coefficient $\zeta$ is set. In the above processing, the processing of steps S12, S13, S15 and S17 constructs road width detecting means for detecting a road width (number of lanes). The processing of steps S14, S16 and S18 constructs vehicle speed control means for controlling a vehicle speed on the basis of the road width detected by the road width detecting means.

The manner of operation of the first embodiment will be discussed hereinafter.

It is now assumed that ACC is set in the operative condition This assumption may include a case that a preceding vehicle is disappeared during ACC set condition, that a lane change of the host vehicle is executed during ACC set condition, or that the host vehicle overtakes a preceding vehicle.

In reply to the on-setting of ACC, preceding vehicle following control section 30 or vehicle speed control section 13 of following controller 10 executes the damping coefficient setting processing shown in FIG. 10. When controller 10 can receive the information as to the number of lanes from car navigation system 3 by the execution of step S12 in FIG. 10, and sets damping coefficient $\zeta$ according to the number of lanes. More specifically, when the number of lanes of the road now traveled by the host vehicle is greater than or equal to 4 ([number of lanes]$\geq$4), or when the road traveled by the host vehicle is a special road, the product of original damping coefficient (default value) $\zeta$ and 1.1 is set at new damping coefficient $\zeta$ ($\zeta=\zeta\times1.1$) by the execution of steps S13 and S14 in FIG. 10. When the number of lanes of the road now traveled by the host vehicle is 3 ([number of lanes]=3), the product of original damping coefficient (default value) $\zeta$ and 1.05 is set as new natural frequency $\zeta$ ($\zeta=\zeta\times1.05$) by the execution of steps S15 and S16 in FIG. 10. When the number of lanes of the road now traveled by the host vehicle is 1 ([number of lanes]=1), the product of original damping coefficient (default value) $\zeta$ and 0.95 is set as new damping coefficient $\zeta$ ($\zeta=\zeta\times0.95$) by the execution of steps S17 and S18 in FIG. 10. Further, when the number of lanes of the road now traveled by the host vehicle is 2 ([number of lanes]=2), or when it is not possible to receive the information as to the number of lanes, original damping coefficient (default value) $\zeta$ is maintained without being multiplied by any coefficient.

Further, when there is a preceding vehicle ahead of the host vehicle, controller 10 executes the following control. For example, in case that a preceding vehicle disappears during ACC set condition, that a lane change of the host vehicle is executed during ACC set condition, or that the host vehicle overtakes a preceding vehicle, when a preceding vehicle is then detected, controller 10 executes the preceding-vehicle following control using damping coefficient $\zeta$ set in the manner explained above.

Figure 11:
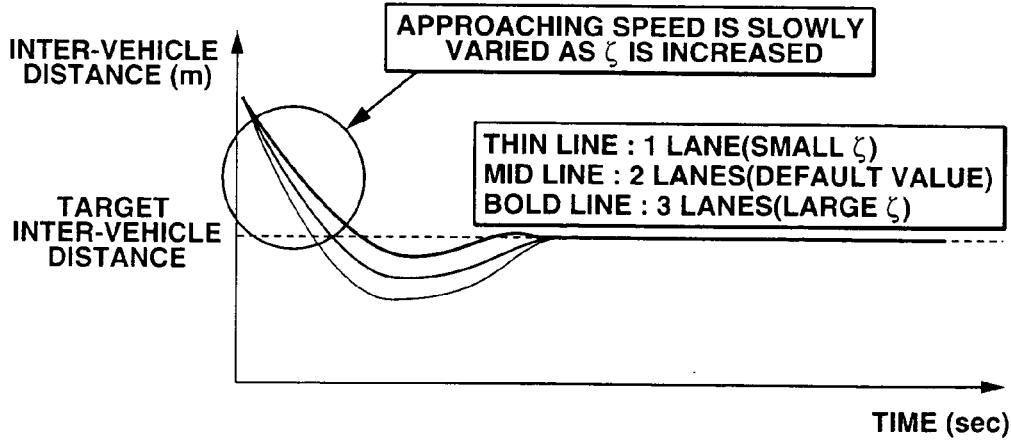
FIG. 11 is a graph showing a preceding-vehicle following characteristic by each number of lanes in case that the damping coefficient is set according to the number of lanes in the second embodiment.

FIG. 11 shows characteristics of the preceding vehicle following control executed in the second embodiment according to the present invention. These characteristics shows the following characteristics during a period until the host vehicle achieves the target inter-vehicle distance for each damping coefficient $\zeta$, that is, for each number of lanes of the traveling road. In FIG. 11, a thin line shows a characteristic under a condition that the host vehicle travels a road having 1 lane and therefore damping coefficient $\zeta$ is set at a value smaller than the default value. A mid line shows a characteristic under a condition the host vehicle travels a road having 2 lanes and therefore damping coefficient $\zeta$ is set at the default value. A bold line shows a characteristic in case that the host vehicle travels a road having 3 lanes and therefore damping coefficient $\zeta$ is set at a value greater than the default value.

As is apparent from these characteristic lines, each characteristic of each condition of the number of lanes is set to be converged into the target inter-vehicle distance L*. On the other hand, an overshoot of the actual inter-vehicle distance L relative to target inter-vehicle distance L* decreases as the number of lanes becomes larger, that is, as damping coefficient $\zeta$ is increased. That is, the converging characteristic to the target inter-vehicle distance L* is achieved by slower change of the vehicle speed as the number of lanes of the traveling road increases.

Herein, the characteristics shown in FIG. 11 can be explained using the expressions (12), (13) and (14) as follows.

According to the expressions (12), control gain $f_v$ becomes smaller as damping coefficient $\zeta$ is increased. According to the expression (13), host vehicle speed V is greater than preceding vehicle speed $V_T$ when the host vehicle approaches the preceding vehicle. Therefore, relative state $\Delta V$ takes a negative value (minus value) during this approaching period.

Thus, by increasing damping coefficient $\zeta$, control gain $f_v$ is decreased and. Further, when the host vehicle approaches the preceding vehicle, the actual inter-vehicle distance L becomes larger than target inter-vehicle distance L* and relative speed $\Delta V$ takes a negative value. Therefore, in the expression (14), a right-side third term $(+(1-f_v)\Delta V)$ takes a positive as small as possible, as far as $f_v$ is smaller than 1 although a right-side second term $(-f_d(L^*-L))$ does not relates to damping coefficient $\zeta$ so that no change is occurred a right-side second term $(-f_d(L^*-L))$ even if damping coefficient $\zeta$ is changed. As a result, by increasing damping coefficient $\zeta$, target vehicle speed V* takes a small value as small as possible. Further, this target vehicle speed V* functions as a control target of the vehicle speed when the host vehicle approaches a preceding vehicle.

The right-side third term relates to relative speed $\Delta V$ and functions such that an overshoot relative to target inter-vehicle distance L* increases as relative speed $\Delta V$ increases. Therefore, by increasing damping coefficient $\zeta$, the overshoot is suppressed.

As discussed above, due to the expressions (12), (13) and (14), by increasing damping coefficient $\zeta$ as the number of lanes of the traveling road increases, the convergence characteristic performs such that an overshoot relative to target inter-vehicle distance L*, which relates to relative speed $\Delta V$, becomes small.

Thus, the preceding-vehicle following control system of the second embodiment according to the present invention executes the preceding vehicle following control by setting damping coefficient ζ according to the number of lanes and by decreasing the change of the vehicle speed toward the target inter-vehicle distance as the number of lanes increases.

Subsequently, the advantages of the second embodiment according to the present invention will be discussed.

As discussed above, the preceding-vehicle following control system according to the present invention executes the preceding vehicle following control by setting natural frequency $\omega_n$ according to the number of lanes and by decreasing the change of the vehicle speed toward the target inter-vehicle distance as the number of lanes increases. More specifically, the preceding vehicle following control system of the second embodiment executes the preceding vehicle following control by decreasing the overshoot relative to target inter-vehicle distance L*.

Generally, when the host vehicle travels a road having many lanes and when the driver of the host vehicle tries to approach a preceding vehicle ahead of the host vehicle, the driver tends to feel that the approaching speed is too high. Taking account of this tendency, the preceding vehicle control system of the second embodiment of the present invention is arranged such that the host vehicle approaches a preceding vehicle to achieve the target inter-vehicle distance, by decreasing the change of the vehicle speed as the number of lanes of the traveling road increases, more specifically, by decreasing the overshoot relative to target inter-vehicle distance L*. Therefore, it is possible to suppress or prevent the driver from having such a feeling of approaching the preceding vehicle at too high vehicle speed.

Subsequently, there will be discussed a third embodiment of the preceding-vehicle following control system according to the present invention with reference to FIGS. 10 and 11.

Although the first and second embodiments have been arranged such that the setting of natural frequency $\omega_n$ or damping coefficient ζ is executed according to the number of lanes of the traveling road, the third embodiment is arranged to obtain a lane width of the traveling road and to set natural frequency $\omega_n$ according to the obtained lane width.

The preceding-vehicle following control system of the third embodiment is arranged such that vehicle speed control section 13 or preceding vehicle following control section 30 of controller 10 executes the setting of natural frequency $\omega_n$ according to the lane width.

Further, controller 10 obtains information as to lane width from picture data taken by CCD camera 2. For example, a lane-keep traveling control system has employed a technique for obtaining lane data. More specifically, such a lane-keep traveling control system is generally arranged to detect lane markers on the traveling road by means of a camera and to control a vehicle so as to travel within a traveling lane on the basis of the detected lane-markers. Japanese Patent Provisional Publication No. 2001-266163 discloses such a lane-keep traveling control system.

In this third embodiment, by utilizing the above-discussed technique, controller 10 obtains lane width data on the basis of the lane markers in image picture taken by CCD camera 2. The other construction of controller 10 of the third embodiment is basically the same as that of the first embodiment shown in FIGS. 1 through 7, and the explanation thereof is omitted herein.

Figure 12:
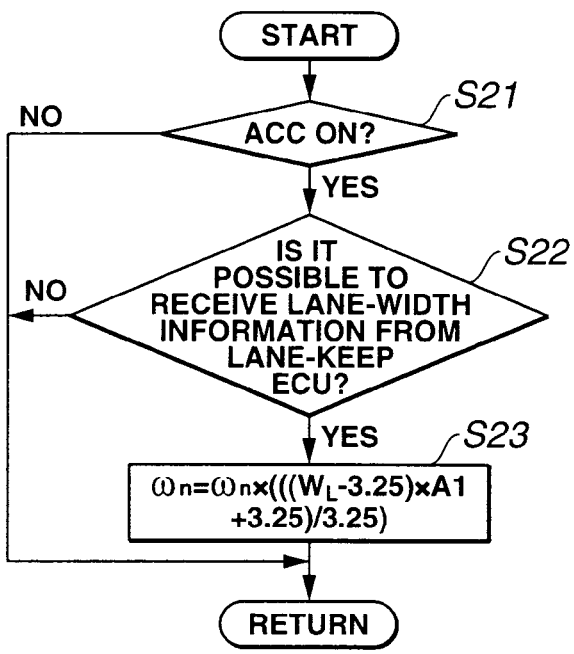
FIG. 12 is a flowchart showing a natural frequency setting processing executed in a third embodiment.

FIG. 12 is a flowchart showing a natural frequency setting processing for setting natural $\omega_n$. Vehicle speed control section 13 or preceding vehicle following control section 30 of controller 10 in the third embodiment executes this natural frequency setting processing at predetermined time intervals.

At step S21 controller 10 determines whether or not ACC (adaptive cruise control) is set in an operative condition. When the determination at step S21 is affirmative, the program proceeds to step S22. When the determination at step S21 is negative, the present processing is terminated.

At step S22 controller 10 determines whether or not it is possible to receive information as to the lane width of the traveling road from image picture taken by CCD camera 2, which may be employed in a lane-keep ECU (electronic control unit) for executing the lane-keep traveling control. When the determination at step S22 is affirmative, the program proceeds to step S23. When the determination at step S22 is negative, the present processing is terminated.

At step S23 controller 10 calculates natural frequency $\omega_n$ from the following expression (17) using the lane width received from lane-keep ECU as a variable.

$$\omega_n = \omega_n \times (((W_L - 3.25) \times A1 + 3.25)/3.25) \quad (17)$$

where $W_L$ is a lane width (m), A1 is a set variable and is set at 0.5 in this embodiment, and $\omega_n$ in the right side of the expression (17) is a default value of the natural frequency $\omega_n$.

A regulation as to a road has determined a lane width. For example, a lane width of a highway in Japan has been set within a range from 3.25 m to 3.75 m. Generally, including general vehicle roads in Japan and roads in foreign countries, the lane wide ranges almost from 2.7 m to 4.2 m. A value "3.25" in the expression (17) has been determined upon taking account of this relationship. More specifically, the expression (17) is provided, on the presumption that the preceding-vehicle following control is executed when the host vehicle travels a highway. Accordingly, if the traveling road is a normal road or a road in a foreign country, the value "3.25" in the expression (17) is changed according to the kind of the traveling road.

In the manner of explained above, natural frequency $\omega_n$ is set in an operative condition. In the above processing, the processing of step S22 constructs road width detecting means for detecting a road width (number of lanes). The processing of step S23 constructs vehicle speed control means for controlling vehicle speed on the basis of the road width detected by the road width detecting means.

The manner of operation of the third embodiment will be discussed hereinafter.

It is now assumed that ACC is set in an operative condition. This assumption may include a case that a preceding vehicle is disappeared during ACC set condition, that a lane change of the host vehicle is executed during ACC set condition, or that the host vehicle overtakes a preceding vehicle.

In reply to the setting of ACC, preceding-vehicle following control section 30 or vehicle speed control section 13 of following controller 10 executes the natural frequency setting processing shown in FIG. 12. When controller 10 can receive the information as to the lane width of the traveling road from the lane-keep ECU by the execution of step S22 in FIG. 12, natural frequency $\omega_n$ according to the lane width is determined from the expression (17) by executing step S23 in FIG. 12.

For example, when the lane width is 2.7 m, natural frequency $\omega_n$ is set around 1.08 from the expression (17). When the lane width is 3.25 m, natural frequency $\omega_n$ is set at the default value. When the lane width is 4.2 m, natural frequency $\omega_n$ is set around 0.85. Thus, natural frequency $\omega_n$ is increased as the lane width increases.

Further, when there is a preceding vehicle ahead of the host vehicle, controller 10 executes the following control for following the preceding vehicle ahead of the host vehicle while keeping target inter-vehicle distance L*. For example, in case that a preceding vehicle is disappeared during ACC set condition, that a lane change of the host vehicle is executed during ACC set condition, or that the host vehicle overtakes a preceding vehicle, when a preceding vehicle is then detected, controller 10 executes the preceding vehicle following control using natural frequency $\omega_n$ set in the manner explained above.

Figure 13:
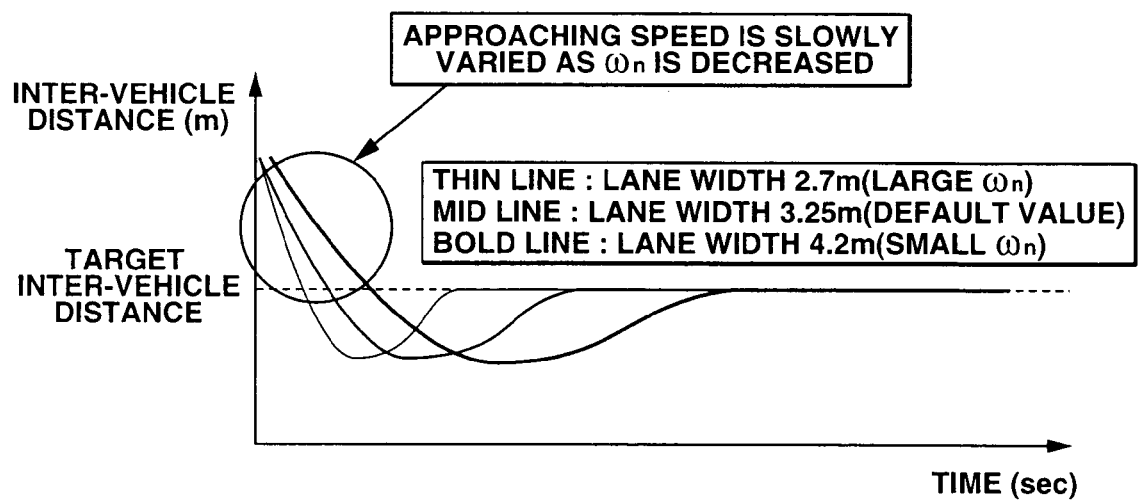
FIG. 13 is a graph showing a preceding-vehicle following characteristic by each lane width in case that natural frequency is set according to the lane width in the third embodiment.

FIG. 13 shows characteristics of the preceding vehicle following control executed in the third embodiment according to the present invention. These characteristics are the preceding-vehicle following characteristics during a period until the host vehicle achieves the target inter-vehicle distance. In FIG. 13, the above discussed example is shown as a parameter of the lane width. More specifically, a thin line shows a characteristic in case that the lane width is 2.7 m where natural frequency $\omega_n$ is greater than the default value. A mid line shows a characteristic in case that the lane width is 3.25 where natural frequency $\omega_n$ is equal to the default value. A bold line shows a characteristic in case that the lane width is 4.2 where natural frequency $\omega_n$ is smaller than the default value.

As is apparent from these characteristic lines, each characteristic of each lane width is set to be converged into the target inter-vehicle distance L*. On the other hand, as the lane width increases, that is, as natural frequency $\omega_n$ is decreased, the time period necessary for reaching the target inter-vehicle distance increases in the control of the third embodiment. That is, the converging characteristic to the target inter-vehicle distance L is achieved by slower change of the vehicle speed as the lane width increases.

Herein, the characteristics shown in FIG. 13 can be explained using the expressions (12), (13) and (14) as follows.

According to the expressions (12), control gain $f_v$ becomes larger as natural frequency $\omega_n$ is decreased. Further, according to the expressions (12), control gain $f_d$ becomes smaller as natural frequency $\omega_n$ is decreased. According to the expression (13), host vehicle speed V is greater than preceding vehicle speed $V_T$ when the host vehicle approaches the preceding vehicle. Therefore, relative speed $\Delta V$ takes a negative value (minus value) during this approaching period. Thus, by decreasing natural frequency $\omega_n$, control gain $f_v$ is increased and control gain $f_d$ is decreased. Further, when the host vehicle approaches the preceding vehicle, the actual inter-vehicle distance L becomes larger than target inter-vehicle distance L* and relative speed $\Delta V$ takes a negative value. Therefore, in the expression (14), a right-side second term $(-f_d(L^*-L))$ takes a positive and small value and a right-side third term $(+(1-f_v)\Delta V)$ takes a positive value as small as possible, as far as control gain $f_v$ is smaller than 1. As a result, by decreasing natural frequency $\omega_n$, target vehicle speed V* takes a small value as small as possible. Further, this target vehicle speed V* functions as a control target of the vehicle speed when the host vehicle approaches a preceding vehicle.

As discussed above, due to the expressions (12), (13) and (14), by decreasing natural frequency $\omega_n$ as the lane width of the traveling road, the characteristic of the third embodiment performs so that the time period for reaching the target inter-vehicle distance is increased. More specifically, the change of the vehicle speed is decreased as the lane width increases, and the inter-vehicle distance converges to the target inter-vehicle distance.

Thus, the preceding-vehicle following control system of the third embodiment according to the present invention executes the preceding-vehicle following control by setting natural frequency $\omega_n$ according to the lane width and by decreasing the change of the vehicle speed toward the target inter-vehicle distance as the lane width increases.

Subsequently, the advantages of the third embodiment according to the present invention will be discussed.

As discussed above, the preceding-vehicle following control system according to the present invention executes the preceding vehicle following control by setting natural frequency $\omega_n$ according to the lane width and by decreasing the change of the vehicle speed toward the target inter-vehicle distance as the lane width increases.

Generally, when the host vehicle travels a road having a wide lane (wide lane width) and when the driver of the host vehicle tries to approach a preceding vehicle ahead of the host vehicle, the driver tends to feel that the approaching speed is too high. Taking account of this tendency, the preceding-vehicle following control system according to the third embodiment of the present invention is arranged such that the host vehicle approaches a preceding vehicle to achieve the target inter-vehicle distance, by decreasing the change of the vehicle speed as the lane width of the traveling road increases. This suppresses or prevents the driver from having such a feeling of approaching the preceding vehicle at too high vehicle speed.

Subsequently, there will be discussed a fourth embodiment of the preceding-vehicle following control system according to the present invention with reference to FIGS. 14 and 15.

Although the third embodiment has been arranged such that the change of the vehicle speed until reaching the target inter-vehicle distance is decreased as the lane width increases, the fourth embodiment is arranged to obtain a lane width of the traveling road and to set damping coefficient $\zeta$ according to the obtained lane width so that the change of the vehicle speed until reaching the target inter-vehicle distance is decreased as the lane width increases, as is similar to the second embodiment according to the present invention.

The preceding-vehicle following control system of the fourth embodiment is arranged such that vehicle speed control section 13 or preceding vehicle following control section 30 of controller 10 executes the setting of damping coefficient $\zeta$ according to the obtained lane $\omega_n$ according to the lane width.

Further, controller 10 obtains information as to the lane width from picture data taken by CCD camera 2 as is similar to the third embodiment. The other construction of controller 10 of the fourth embodiment is basically the same as that of the first embodiment shown in FIGS. 1 through 7, and the explanation thereof is omitted herein.

Figure 14:
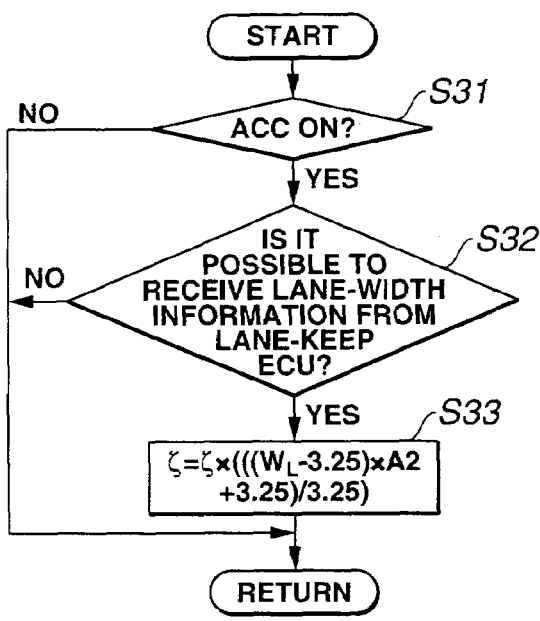
FIG. 14 is a flowchart showing a damping coefficient setting processing executed in a fourth embodiment.

FIG. 14 is a flowchart showing a damping coefficient setting processing for setting damping coefficient $\zeta$. Vehicle speed control section 13 or preceding vehicle following control section 30 of controller 10 of the fourth embodiment executes this damping coefficient setting processing at predetermined time intervals.

At step S31 controller 10 determines whether or not ACC (adaptive cruise control) is set in an operative condition. When the determination at step S31 is affirmative, the program proceeds to step S32. When the determination at step S31 is negative, the present processing is terminated.

At step S32 controller 10 determines whether or not it is possible to receive information as to the lane width of the traveling road from image picture taken by CCD camera 2 which may be employed in the lane-keep ECU (electronic control unit) for executing the lane-keep traveling control. When the determination at step S32 is affirmative, the program proceeds to step S33. When the determination at step S32 is negative, the present processing is terminated.

At step S33 controller 10 calculates damping coefficient $\zeta$ from the following expression (18) using the lane width received from lane-keep ECU as a variable.

$$\zeta = \zeta \times (((W_L - 3.25) \times A2 + 3.25)/3.25) \qquad (18)$$

where $W_L$ is a lane width (m), A2 is a set variable and is set at 0.2 in this embodiment, and $\zeta$ in the right side is a default value of the damping coefficient.

In the manner of explained above, damping coefficient $\zeta$ is set. In the above processing, the processing of step S32 constructs a road width detecting means for detecting a road width (number of lanes). The processing of step S33 constructs a vehicle speed control means for controlling a vehicle speed on the basis of the road width detected by the road width detecting means.

The manner of operation of the fourth embodiment will be discussed hereinafter.

It is now assumed that ACC is set in an operative condition. This assumption may include a case that a preceding vehicle is disappeared during ACC set condition, that a lane change of the host vehicle is executed during ACC set condition, or that the host vehicle overtakes a preceding vehicle.

In reply to the setting of ACC, preceding vehicle following control section 30 or vehicle speed control section 13 of following controller 10 executes the natural frequency setting processing shown in FIG. 14. When controller 10 can receive the information as to the lane width from CCD camera 2 by the execution of step S32 in FIG. 14, damping coefficient $\zeta$ according to the lane width is determined from the expression (18) by executing step S33 in FIG. 14.

For example, when the lane width is 2.7 m, damping coefficient $\zeta$ is set around 0.97 from the expression (18). When the lane width is 3.25 m, damping coefficient $\zeta$ is set at the default value. When the lane width is 4.2 m, damping coefficient $\zeta$ is set around 1.06. Thus, damping coefficient $\zeta$ is decreased as the lane width increases.

Further, when there is a preceding vehicle ahead of the host vehicle, controller 10 executes the following control. For example, in case that a preceding vehicle disappears during ACC set condition, that a lane change of the host vehicle is executed during ACC set condition, or that the host vehicle overtakes a preceding vehicle, when a preceding vehicle is then detected, controller 10 executes the preceding vehicle following control using damping coefficient $\zeta$ set in the manner explained above.

Figure 15:
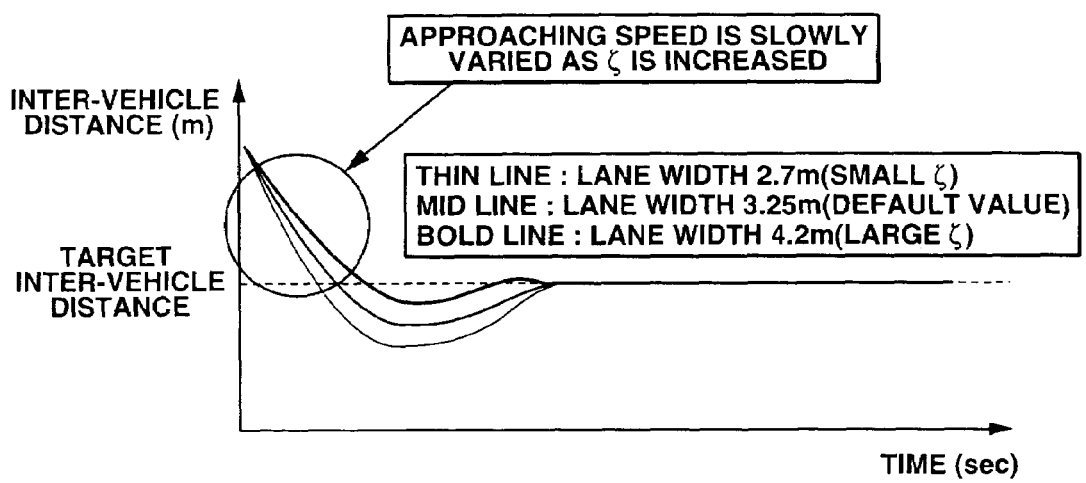
FIG. 15 is a graph showing a preceding-vehicle following characteristic by each lane width in case that a damping coefficient is set according to the lane width in the fourth embodiment.

FIG. 15 shows characteristics of the preceding vehicle following control executed in the fourth embodiment according to the present invention. These characteristics show the preceding-vehicle following characteristics during a period until the host vehicle achieves the target inter-vehicle distance. In FIG. 15, the above discussed example is shown as a parameter of the lane width. More specifically, a thin line shows a characteristic in case that the lane width is 2.7 m where damping coefficient $\zeta$ is smaller than the default value. A mid line shows a characteristic in case that the lane width is 3.25 m where damping coefficient $\zeta$ is equal to the default value. A bold line shows a characteristic in case that the lane width is 4.2 where damping coefficient $\zeta$ is larger than the default value.

As is apparent from these characteristic lines, each characteristic of each lane width is set to be converged into the target inter-vehicle distance L*. On the other hand, as the lane width increases, that is, as damping coefficient $\zeta$ is increased, the overshoot relative to target inter-vehicle distance L* is decreased, and the change of the vehicle speed also decreases as damping coefficient $\zeta$ is increased in the control of the fourth embodiment. That is, the converging characteristic to the target inter-vehicle distance L* is achieved by slower change of the vehicle speed as the lane width increases.

Herein, the characteristics shown in FIG. 13 can be explained using the expressions (12), (13) and (14) as follows.

According to the expressions (12), control gain $f_v$ becomes smaller as damping coefficient $\zeta$ is increased. According to the expression (13), host vehicle speed V is greater than preceding vehicle speed $V_T$ when the host vehicle approaches the preceding vehicle. Therefore, relative state $\Delta V$ takes a negative value (minus value) during this approaching period.

Thus, by increasing damping coefficient $\zeta$, control gain $f_v$ is decreased. Further, when the host vehicle approaches the preceding vehicle, the actual inter-vehicle distance L becomes larger than target inter-vehicle distance L and relative speed $\Delta V$ takes a negative value. Therefore, in the expression (14), a right-side third term $(+(1-f_v)\Delta V)$ takes a positive as small as possible, as far as $f_v$ is smaller than 1 although a right-side second term $(-f_d(L^*-L))$ does not relates to damping coefficient $\zeta$ so that no change is occurred a right-side second term $(-f_d(L^*-L))$ even if damping coefficient $\zeta$ is changed. As a result, by increasing damping coefficient $\zeta$, target vehicle speed V* takes a small value as small as adaptable. Further, this target vehicle speed V* functions as a control target of the vehicle speed when the host vehicle approaches a preceding vehicle.

The right-side third term relates to relative speed $\Delta V$ and functions such that an overshoot relative to target inter-vehicle distance L* increases as relative speed $\Delta V$ increases. Therefore, by increasing damping coefficient $\zeta$, the overshoot is suppressed.

As discussed above, due to the expressions (12), (13) and (14), by increasing damping coefficient $\zeta$ as the lane width of the traveling road increases, the convergence characteristic performs such that an overshoot relative to target inter-vehicle distance L*, which relates to relative- vehicle following control system of the fourth embodiment according to the present invention executes the preceding-vehicle following control by setting damping coefficient $\zeta$ according to the lane width and by decreasing the change of the vehicle speed toward the target inter-vehicle distance as the lane width increases.

Subsequently, the advantages of the second embodiment according to the present invention will be discussed.

As discussed above, the preceding-vehicle following control system according to the present invention executes the preceding-vehicle following control by setting damping coefficient $\zeta$ according to the lane width and by decreasing the change of the vehicle speed toward the target inter-vehicle distance as the lane width increases. More specifically, the preceding vehicle following control system of the fourth embodiment executes the preceding vehicle following control by decreasing the overshoot relative to target inter-vehicle distance L*.

Generally, when the host vehicle travels a road having a wide lane and when the driver of the host vehicle tries to approach a preceding vehicle ahead of the host vehicle, the driver tends to feel that the approaching speed is too high. Therefore, the preceding-vehicle following control system according to the fourth embodiment of the present invention is arranged such that the host vehicle approaches a preceding vehicle to achieve the target inter-vehicle distance, by decreasing the change of the vehicle speed as the lane width of the traveling road increases, more specifically, by decreasing the overshoot relative to target inter-vehicle distance L*. Accordingly, it becomes possible to suppress or prevent the driver from having such a feeling of approaching the preceding vehicle at too high vehicle speed.

Figure 16:
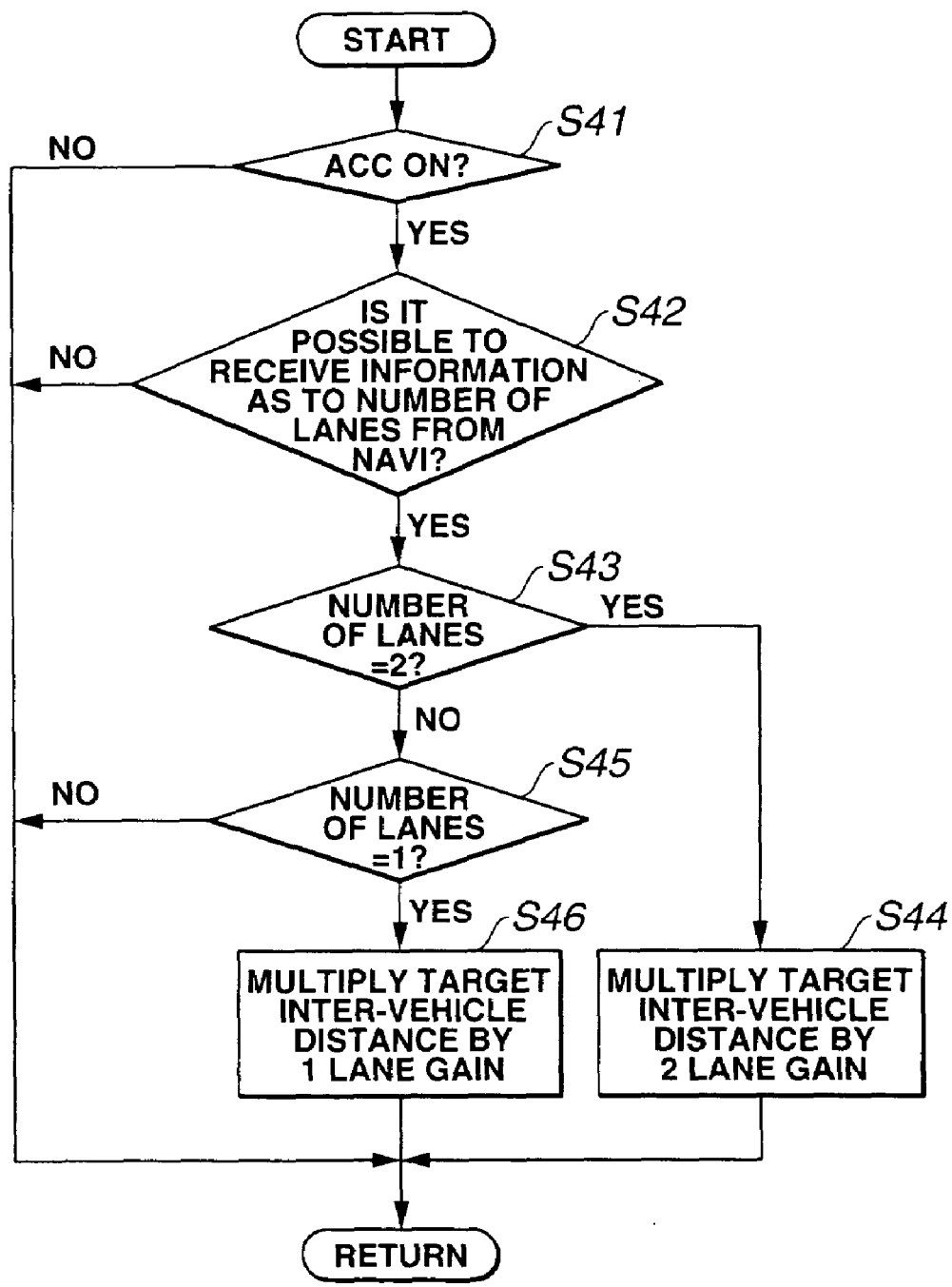
FIG. 16 is a flowchart showing a target inter-vehicle distance setting processing executed in a fifth embodiment.

Subsequently, there will be discussed a fifth embodiment of the preceding-vehicle following control system according to the present invention with reference to FIGS. 16 through 18.

Although the first embodiment is arranged such that the change of the vehicle speed for a period approaching the target inter-vehicle distance is decreased as the number of lanes of the traveling road increases, the fifth embodiment is arranged such that target inter-vehicle distance L is set according to the number of lanes of the traveling road.

The preceding-vehicle following control system of the fifth embodiment is arranged such that target inter-vehicle distance setting section 33 of following controller 10 executes the setting of target inter-vehicle distance L* according to the number of lanes of the traveling road. The other construction of controller 10 of the fifth embodiment is basically the same as that of the first embodiment shown in FIGS. 1 through 7, and the explanation thereof is omitted herein.

FIG. 15 is a flowchart showing a target inter-vehicle distance setting processing for setting target inter-vehicle distance L*. Target inter-vehicle distance control section 33 of following controller 10 of the fifth embodiment executes this target inter-vehicle distance setting processing at predetermined time intervals.

At step S41 controller 10 determines whether or not ACC is set in an operative condition. When the determination at step S41 is affirmative, the program proceeds to step S42. When the determination at step S41 is negative, the present processing is terminated.

At step S42 controller 10 determines whether or not it is possible to receive information as to the number of lane of the traveling road from car navigation system 3. When the determination at step S42 is affirmative, the program proceeds to step S43. When the determination at step S42 is negative, the present processing is terminated.

At step S43 controller 10 determines whether or not the number of lanes is equal to 2. When the determination at step S43 is affirmative, the program proceeds to step S44. When the determination at step S43 is negative, the program proceeds to step S45.

Figure 17:
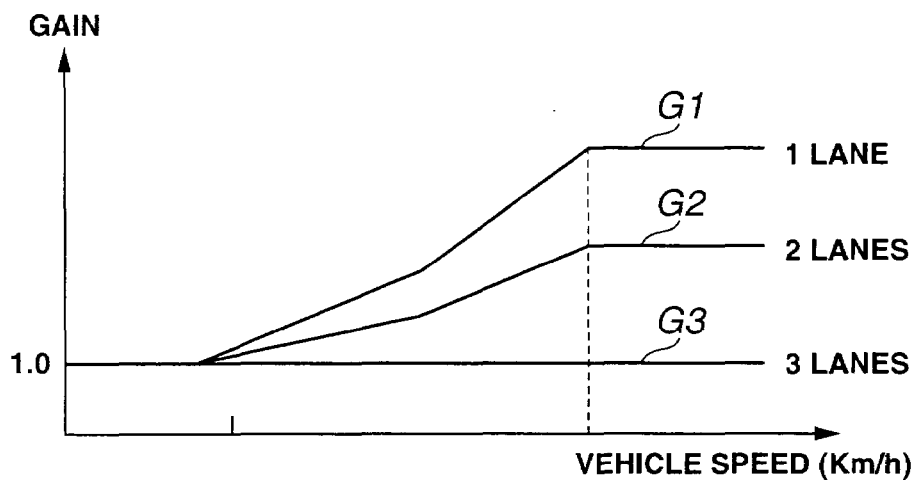
FIG. 17 is a graph showing gains, which are employed in the fifth embodiment and are determined according to the number of lanes and the vehicle speed.

At step S44 controller 10 multiplies target inter-vehicle distance L* by a 2-lane gain G2 obtained from a gain map shown in FIG. 17. Target inter-vehicle distance L* employed at this step S44 is obtained from the expression (15) or (16). More specifically, controller 10 obtains the 2-lane gain G2 from the gain map in FIG. 17 and obtains a new target inter-vehicle distance L* by multiplying the obtained 2-lane gain G2 and target inter-vehicle distance L* (L*=G2×L*).

As shown in FIG. 17, the gain map represents a relationship between the vehicle speed and the gain, and is represented by each number of lanes, such as 1 lane, 2 lanes and 3 lanes as a parameter.

The characteristic of the gain in case of 3 lanes takes a constant value 1.0 regardless the vehicle speed. The characteristics of the gain G1, G2 in case of each of 1 lane and 2 lanes gradually increases from 1.0 according to the increase of the vehicle speed from a first predetermined vehicle speed to a second predetermined vehicle speed as shown in FIG. 17. When the vehicle speed becomes greater than the second predetermined vehicle speed, the gain G1, G2 of each of 1-lane and 2-lanes takes a constant value as same as the value at the second predetermined vehicle speed.

The characteristic of the gain G1 of 1-lane is set to radically increase as compared with the increase of the gain G2 of 2-lanes. That is, the gain G1, G2 is increased as the number of lanes is decreased from 3 lanes, and the gain G1, G2 is increased according to the increase of the vehicle speed.

At step S45 controller 10 determines whether or not the number of lanes is 1. When the determination at step S45 is affirmative, the program proceeds to step S46. When the determination at step S46 is negative, the present processing is terminated.

At step S46 controller 10 multiplies target inter-vehicle distance L* by 1-lane gain G1 obtained from a gain map shown in FIG. 17. More specifically, controller 10 obtains 1-lane gain G1 from the gain map in FIG. 17 and obtains a new target inter-vehicle distance L* by multiplying the obtained 1-lane gain G1 and target inter-vehicle distance L* (L*=G1×L*).

When the determination at step S43 is negative and when the determination at step S45 is negative, that is, when the number of lanes of the traveling road is greater than or equal to 3, controller 10 obtains a new target inter-vehicle distance L* by multiplying target inter-vehicle speed L* and a gain G3 (G3=1) for 3 lanes (L*=G3×L*). Target inter-vehicle distance L* employed at this step S44 is obtained from the expression (15) or (16).

In the manner of explained above, target inter-vehicle distance L* is set. In the above processing, the processing of step S42 constructs road width detecting means for detecting a road width (number of lanes). The processing of steps S43 through S46 constructs an inter-vehicle distance setting means for setting the target inter-vehicle distance on the basis of the road width detected by road width detecting means or inter-vehicle distance setting means for correcting the target inter-vehicle distance on the basis of the road width detected by the road width detecting means.

The manner of operation of the fifth embodiment will be discussed hereinafter.

When ACC is set in an operative condition, target inter-vehicle setting section 33 of following controller 10 executes the target inter-vehicle distance setting processing through the execution of step S41. When controller 10 can receive the information as to the number of lanes from car navigation system 3, that is, when the determination at step S42 is affirmative, controller 10 sets target inter-vehicle distance L* according to the number of lanes received. More specifically, when the number of lanes of the traveling road is 2, 2-lane gain G2 is selected from the gain map shown in FIG. 17 and determines the gain G2 according to the vehicle speed. Further controller 10 obtains new target inter-vehicle distance L by multiplying the determined gain G2 and target inter-vehicle distance L* (L*=G2×L*) by executing the processing at steps S43 and S44. Further, when the number of lanes of the traveling road is 1, the 1-lane gain G1 is selected from the gain map shown in FIG. 17 and determines the gain G1 according to the vehicle speed. Further controller 10 obtains new target inter-vehicle distance L* by multiplying the determined gain G1 and target inter-vehicle distance L* (L*=G1×L*) by executing the processing at steps S45 and S46. When the number of lanes of the traveling road is 3 or more, the 3-lane gain G3 is selected from the gain map shown in FIG. 17 and determines the gain G3 according to the vehicle speed. Further controller 10 obtains new target inter-vehicle distance L* by multiplying the determined gain G3 and target inter-vehicle distance L* (L*=G3×L*). Therefore, controller 10 controls the vehicle speed so as to bring the actual inter-vehicle distance L closer to target inter-vehicle distance L*.

The gain G1, G2 to be multiplied by target inter-vehicle distance L* is mapped so as to increase from a basis of the 3-lane gain as the number of lanes decreases. Further, the gain G1, G2 is increased itself as the vehicle speed is increased.

The corrected target inter-vehicle distance L* obtained by multiplying target inter-vehicle distance L* and gain G1, G2, G3 performs a similar qualitative characteristic. That is, target inter-vehicle distance L* increases as the number of lanes decreases, and further increases as the vehicle speed increases.

Figure 18:
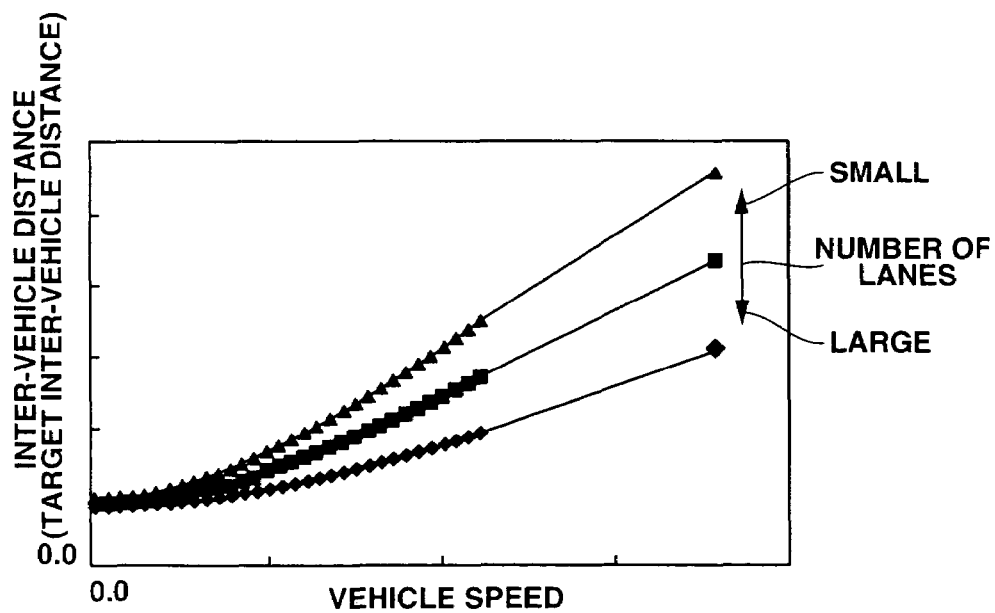
FIG. 18 is a graph showing a preceding-vehicle following characteristic by each lane width in case that the target inter-vehicle distance is set according to the lane width in the fifth embodiment.

FIG. 18 shows a change of the actual inter-vehicle distance L in case that target inter-vehicle distance L* is changed in the manner discussed above. As is apparent from FIG. 18, actual inter-vehicle distance L increases as the number of lanes decreases, and increases as the vehicle speed increases.

Thus, the preceding-vehicle following control system of the fifth embodiment according to the present invention executes a preceding-vehicle following control by setting target inter-vehicle distance L* according to the number of lanes of the traveling road such that the target inter-vehicle distance L* is increased as the number of lanes of the traveling road decreases.

Subsequently, the advantage of the fifth embodiment according to the present invention will be explained.

As discussed above, the preceding-vehicle following control system according to the present invention executes the preceding vehicle following control by setting target inter-vehicle distance L* according to the number of lanes of the traveling road such that the target inter-vehicle distance increased as the number of lanes of the traveling road decreases.

Generally, when the host vehicle travels a road having few number of lanes, the driver of the host vehicle tends to feel that the inter-vehicle distance is too short. According to the fifth embodiment of the present invention, the target inter-vehicle distance L* employed in the preceding vehicle following control is increased as the number of lanes decreases. Therefore, it is possible to suppress or prevent the driver from having such a strange feeling as to the inter-vehicle distance.

Further, a driver tends to increase a degree of a strange feeling as to the inter-vehicle distance as the vehicle speed increases. In contrast, the present invention is arranged such that the gain itself corresponding to the number of lanes of the traveling road is increased as the vehicle speed increases. This further firmly derives the above-discussed advantage.

Subsequently, there will be discussed a sixth embodiment of the preceding-vehicle following control system according to the present invention with reference to FIGS. 19 through 21.

Although the fifth embodiment is arranged to set target inter-vehicle distance according to the number of lanes, the sixth embodiment is arranged to obtain a lane width of the traveling road and to set target inter-vehicle distance L* according to the lane width.

The preceding-vehicle following control system of the sixth embodiment is arranged such that target inter-vehicle distance setting section 33 of following controller 10 executes the setting of target inter-vehicle distance L according to the lane width of the traveling road. Further, information as to the lane width is obtained from image picture taken by CCD camera 2 as discussed in the explanation of the third embodiment.

The other construction of controller 10 of the sixth embodiment is basically the same as that of the first embodiment shown in FIGS. 1 through 7, and the explanation thereof is omitted herein.

Figure 19:
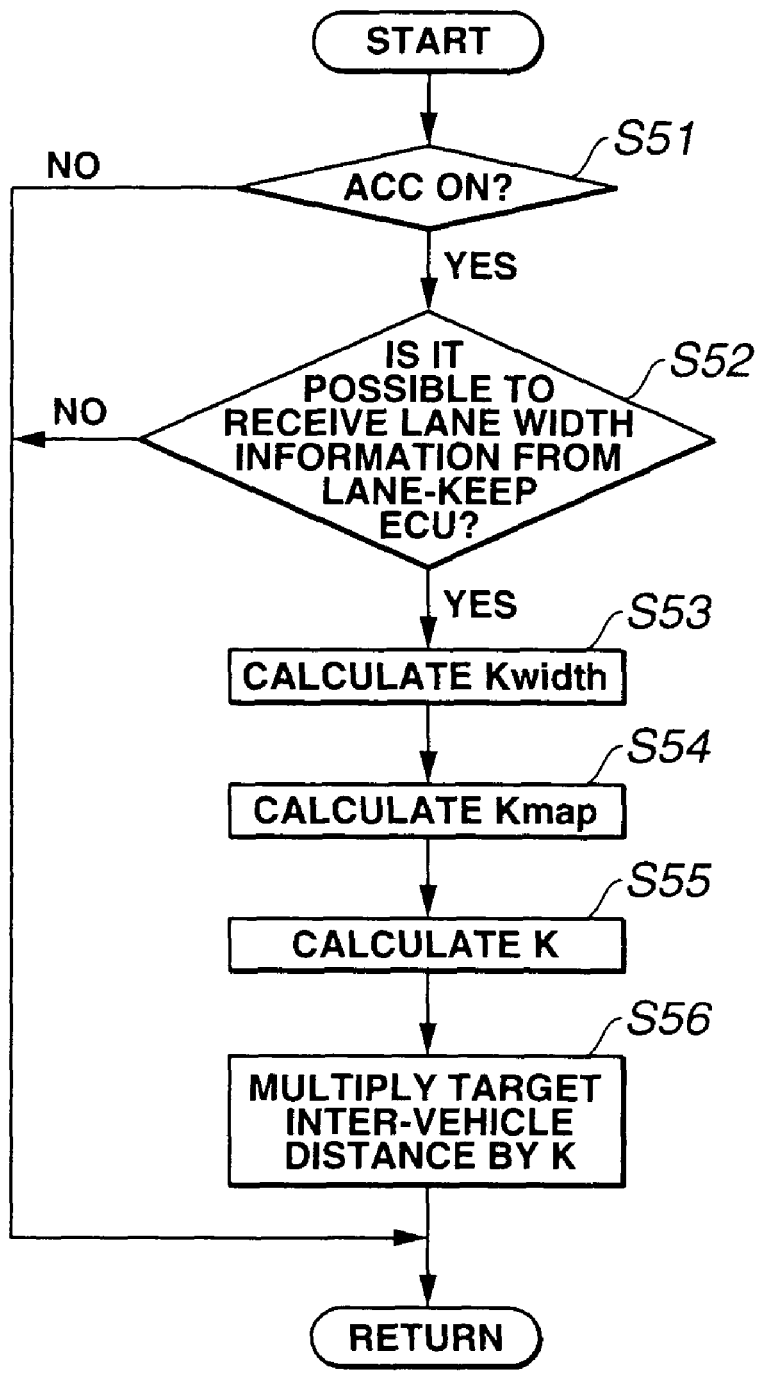
FIG. 19 is a flowchart showing a target inter-vehicle distance setting processing executed in a sixth embodiment.

FIG. 19 is a flowchart showing a target inter-vehicle distance setting processing for setting target inter-vehicle distance L*. Target inter-vehicle distance control section 33 of following controller 10 of the sixth embodiment executes this target inter-vehicle distance setting processing at predetermined time intervals.

At step S51 controller 10 determines whether or not ACC is set in an operative condition. When the determination at step S51 is affirmative, the program proceeds to step S52. When the determination at step S51 is negative, the present processing is terminated.

At step S52 controller 10 determines whether or not it is possible to receive information as to a lane width of the traveling road from CCD camera 2 (or lane-keep ECU). When the determination at step S52 is affirmative, the program proceeds to step S53. When the determination at step S52 is negative, the present processing is terminated.

At step S53 controller 10 calculates a gain Kwidth by treating the lane width received from the lane-keep ECU as variable. In this sixth embodiment, gain Kwidth is calculated using the following expression (19).

$$K\text{width}=(4.2-W_L)/(4.2-2.7) \quad (19)$$

where "4.2(m)" is a default value, and $W_L$ is a lane width (m) of the traveling road.

As previously discussed in the explanation of the third embodiment, a regulation as to a road has determined a lane width. For example, a lane width of a high-way in Japan has been set within a range from 3.25 m to 3.75 m. Generally, including general vehicle roads in Japan and roads in foreign countries, the lane wide ranges almost from 2.7 m to 4.2 m. Therefore, the expression (19) is defined such that the gain Kwidth is decreased as the lane width increases (as the lane width approaches 4.2 m, and that gain Kwidth is increased as the lane width decreases (as the lane width approaches 2.7 m. Thus, at step S53 gain Kwidth including a variable of the lane width is calculated.

Figure 20:
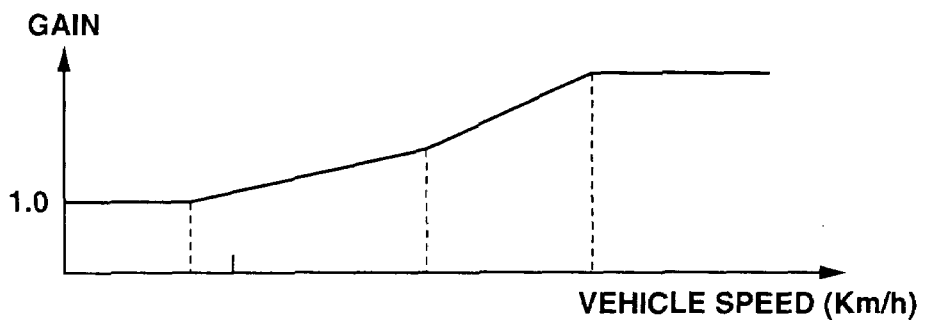
FIG. 20 is a graph showing a gain, which is employed in the sixth embodiment and is determined according to the vehicle speed.

At step S54 subsequent to the execution of step S53, controller 10 calculates a gain Kmap using a gain mapshown in FIG. 20. In the gain map of FIG. 20, gain Kmap is set such that gain Kmap takes 0 between zero vehicle speed to a first predetermined vehicle speed, gain Kmap increases as the vehicle speed increases between the first predetermined vehicle speed and a second predetermined vehicle speed, gain Kmap further increase with a larger gradient as the vehicle speed increases between the second predetermined vehicle speed and a third predetermined vehicle speed, and gain Kmap takes a constant value as same as a value at the third predetermined vehicle speed when the vehicle speed further increases. That is, at step S54, by utilizing this gain map of FIG. 20, gain Kmap is obtained.

At step S55 subsequent to the execution of step S54, controller 10 obtains a gain K using the following expression (20).

$$K = ((K\text{map} - 1.0) \times K\text{width}) + 1.0 \quad (20)$$

At step S56 subsequent to the execution of step S55, controller 10 obtains new target inter-vehicle distance L* by multiplying gain K and target inter-vehicle distance L* (L*=K×L*). Thereafter, the present processing is terminated.

In the manner of explained above, target inter-vehicle distance L is set. In the above processing, the processing of step S52 constructs a road width detecting means for detecting a road width (number of lanes). The processing of steps S53 through S56 constructs an inter-vehicle distance setting means for setting the target inter-vehicle distance on the basis of the road width detected by road width detecting means or inter-vehicle distance setting means for correcting the target inter-vehicle distance on the basis of the road width detected by the road width detecting means.

The manner of operation of the sixth embodiment will be discussed hereinafter.

When ACC is set in an operative condition, target inter-vehicle setting section 33 of following controller 10 executes the target inter-vehicle distance setting processing through the execution of step S51. When controller 10 can receive the information as to the lane width from the lane-keep ECU, that is, when the determination at step S52 is affirmative, controller 10 calculates gain Kwidth according to the lane width using the expression (19) through the execution of step S53. Subsequently, controller 10 calculates gain Kmap according to the vehicle speed through the execution of step S54. Further controller 10 calculates gain K on the basis of gains Kkwidth and Kmap using the expression (20) through the execution of step S55. Then, controller 10 obtains new target inter-vehicle distance L* by multiplying K and target inter-vehicle distance L*. Further, controller 10 controls the vehicle speed so as to bring the actual inter-vehicle distance closer to the obtained target inter-vehicle distance L*.

Herein, gain Kwidth becomes larger as the lane width decreases, as is apparent from the expression (19). Gain Kmap becomes larger above 1.0 as the vehicle speed increases. Therefore, gain K using gains Kwidth and Kmap as variables becomes larger as the lane width decreases, as is apparent from the expression (20).

The corrected target inter-vehicle distance L* obtained by multiplying target inter-vehicle distance L* and gain K performs a similar qualitative characteristic. That is, target inter-vehicle distance L* increases as the lane width decreases, and further increases as the vehicle speed increases.

Figure 21:
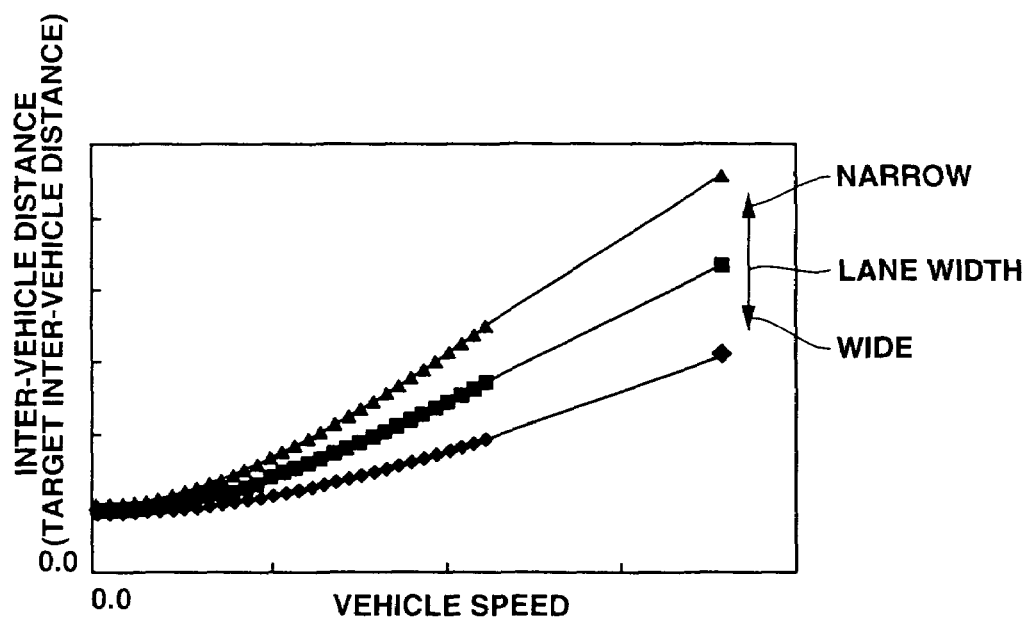
FIG. 21 is a graph showing a preceding-vehicle following characteristic by each lane width in case that the target inter-vehicle distance is set according to the number of lanes in the sixth embodiment.

FIG. 21 shows a change of the actual inter-vehicle distance L in case that target inter-vehicle distance L* is changed in the manner discussed above. As is apparent from FIG. 21, actual inter-vehicle distance L increases as the lane width decreases, and increases as the vehicle speed increases. Thus, the preceding-vehicle following control system of the sixth embodiment according to the present invention executes a preceding vehicle following control by setting target inter-vehicle distance L according to the lane width of the traveling road such that the target inter-vehicle distance increased as the lane width of the traveling road decreases.

Subsequently, the advantage of the sixth embodiment according to the present invention will be explained.

As discussed above, the preceding-vehicle following control system employing the present invention executes the preceding vehicle following control by setting target inter-vehicle distance L according to the lane width of the traveling road such that the target inter-vehicle distance increases as the lane width of the traveling road decreases.

Generally, when the host vehicle travels a road having a narrow lane, the driver of the host vehicle tends to feel that the inter-vehicle distance is too short. According to the sixth embodiment of the present invention, the target inter-vehicle distance employed in the preceding vehicle following control is increased as the lane width decreases. Therefore, it is possible to suppress or prevent the driver from having such a strange feeling as to the inter-vehicle distance.

For example, although the first through fourth embodiments have been shown and described such that the number of lanes or the lane width are specifically mentioned, and natural frequency $\omega_n$ or damping coefficient $\zeta$ set according to the number of lanes or the lane width is specifically described, it will be understood that the invention is not limited to this specific values. For example, in the first and second embodiments, there has been shown and described such that natural frequency $\omega_n$ or damping coefficient $\zeta$ is set at a constant value when the number of lanes is greater than or equal to 4, it is not limited to this and may be arranged such that natural frequency $\omega_n$ or damping coefficient $\zeta$ is further finely set even when the number of lane is greater than or equal to 4.

Although natural frequency $\omega_n$ or damping coefficient $\zeta$ is obtained according to the lane width from the expression (17) or (18), other expression or method may be employed to obtain natural frequency $\omega_n$ or damping coefficient $\zeta$ according to the lane width.

Although the fifth embodiment has been shown and described so as to obtain the gain G1, G2, G3 which is obtained from a map shown in FIG. 17 according to the number of lanes and to obtain target inter-vehicle distance L* by multiplying the obtained gain and previous target inter-vehicle distance L*, the invention is not limited to this. For example, the gain obtaining procedure may not be limited to use the map shown in FIG. 17. Further, although target inter-vehicle distance L* according to the number of lanes is obtained by multiplying the obtained gain and previous target inter-vehicle distance L*, target inter-vehicle distance L* according to the number of lanes may be obtained by other method.

Although the sixth embodiment has been shown and described so as to obtain gain K varied according to the lane width using the expressions (19) and (20) and the map shown in FIG. 20 and to obtain target inter-vehicle distance L* according to the lane width by multiplying the obtained gain and previous target inter-vehicle distance L*, the invention may not be limited to this. For example, the method of obtaining the gain K may not limited to the method of employing the expressions (19) and (20) and the map shown in FIG. 20. Further, although the sixth embodiment is arranged to obtain target inter-vehicle distance L according to the lane width by multiplying the obtained gain and previous target inter-vehicle distance L*, target inter-vehicle distance L* according to the lane width may be obtained by other method.

Although the first though sixth embodiments have been shown and described such that a specific expression or processing procedure for the preceding vehicle following control, the invention is not limited to this and may be adapted to a preceding-vehicle following control executed by other expression or processing procedure, as far as the present invention is applicable to such a control. For example, although only the natural frequency $\omega_n$ is treated as a variable of control gain $f_d$ as shown in the expression (12), damping coefficient $\zeta$ may be also treated as a variable of control gain $f_d$.

Further, although the third, fourth and sixth embodiments have been shown and described to obtain the information as to the lane width by utilizing the technology of the lane-keep control, the invention is not limited to this and may obtain the information as to the lane width by utilizing other technology, such as a technology described in Japanese Patent Provisional Publication No. 8-136237.

This application is based on prior Japanese Patent Applications Nos. 2002-286029 and 2002-286030. The entire contents of the Japanese Patent Applications Nos. 2002-286029 and 2002-286030 with a filing date of Sep. 30, 2002 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A preceding-vehicle following control system for a host vehicle, comprising:
   a controller arranged,
      to obtain road width indicative information of a road traveled by the host vehicle,
      to execute a following control for following a preceding vehicle ahead of the host vehicle according to the road width indicative information, and
   to vary a control gain employed for obtaining a target vehicle speed according to the road width indicative information in the execution of the following control.

2. The preceding-vehicle following control system as claimed in claim 1, wherein the controller is further arranged to vary the control gain so that a change of the target vehicle speed decreases as a road width obtained from the road width indicative information increases.

3. The preceding-vehicle following control system as claimed in claim 1, wherein the controller is further arranged to set the control gain on a basis of a natural frequency of a transfer characteristic in a control system of the following control, and to decrease the natural frequency as the road width increases.

4. The preceding-vehicle following control system as claimed in claim 1, wherein the controller is further arranged to set the control gain on a basis of a damping coefficient of a transfer characteristic in a control system of the following control, and to increase the damping coefficient as the road width increases.

5. The preceding-vehicle following control system as claimed in claim 1, wherein the controller is further arranged to set the control gain on a basis of a natural frequency of a transfer characteristic in a control system of the following control, and to decrease the natural frequency as the road width increases.

6. The preceding-vehicle following control system as claimed in claim 1, wherein the control gain includes first and second control gains, and a target vehicle speed is determined from a sum of a first product and a second product where the first product is obtained by multiplying a difference between an inter-vehicle distance and a target inter-vehicle distance and a first gain, and the second product is obtained by multiplying a relative speed between the host vehicle and a preceding vehicle and a second gain.

7. The preceding-vehicle following control system as claimed in claim 1, wherein the road width indicative information includes at least one of a number of lanes and a lane width of the traveling road.

8. The preceding-vehicle following control system as claimed in claim 1, further comprising a car navigation system connected to the controller, wherein the car navigation system has stored the road width indicative information therein.

9. The preceding-vehicle following control system as claimed in claim 1, further comprising a CCD camera which takes an image picture of a road ahead of the host vehicle, the controller obtaining a lane width of the road based on the image picture.

10. A preceding-vehicle following control system for a host vehicle, comprising:
    a controller arranged,
       to obtain road width indicative information of a road traveled by the host vehicle,
       to execute a following control for following a preceding vehicle ahead of the host vehicle according to the road width indicative information, and to set a target inter-vehicle distance according to the road width indicative information in the execution of the following control.

11. The preceding-vehicle following control system as claimed in claim 10, wherein the controller is further arranged to correct the target inter-vehicle distance on a basis of the road width.

12. The preceding-vehicle following control system as claimed in claim 11, wherein the controller is further arranged to vary a correction quantity of the target inter-vehicle distance on a basis of the host-vehicle speed.

13. The preceding-vehicle following control system as claimed in claim 10, wherein the controller is further arranged to increase the target inter-vehicle distance as host-vehicle speed increases.

14. The preceding-vehicle following control system as claimed in claim 10, wherein the controller is further arranged to increase the target inter-vehicle distance as the road width is decreased.

15. The preceding-vehicle following control system as claimed in claim 10, wherein the controller is further arranged to calculate a target vehicle speed based on a target inter-vehicle distance and to execute the following control using the target vehicle speed.

* * * * *